United States Patent
Thompson

(10) Patent No.: US 8,117,096 B1
(45) Date of Patent: Feb. 14, 2012

(54) PRIVATE EQUITY ACCOUNTING AND REPORTING SYSTEM AND METHOD

(75) Inventor: Jayne Thompson, Alexandria, VA (US)

(73) Assignee: Q-Biz Solutions, LLC, Alexandria, VA (US)

(*) Notice: Subject to any disclaimer, the term of this patent is extended or adjusted under 35 U.S.C. 154(b) by 25 days.

(21) Appl. No.: 12/330,414

(22) Filed: Dec. 8, 2008

Related U.S. Application Data

(60) Provisional application No. 61/012,316, filed on Dec. 7, 2007.

(51) Int. Cl.
*G07B 17/00* (2006.01)

(52) U.S. Cl. ............... 705/30; 705/7; 705/8; 705/10; 705/14; 705/15; 705/22; 705/28; 705/31; 705/32; 705/34; 705/35; 705/36; 705/37; 705/38; 705/39; 705/40

(58) Field of Classification Search .............. 705/30
See application file for complete search history.

(56) References Cited

U.S. PATENT DOCUMENTS

| 7,617,136 B1* | 11/2009 | Lessing et al. ............... 705/28 |
| 7,668,773 B1* | 2/2010 | Pruitt .......................... 705/36 T |
| 2004/0162772 A1* | 8/2004 | Lewis .......................... 705/34 |
| 2007/0244777 A1* | 10/2007 | Torre et al. .................... 705/35 |
| 2008/0071702 A1* | 3/2008 | Howard et al. ............... 705/36 R |
| 2008/0140547 A1* | 6/2008 | Murphy et al. ................ 705/30 |

OTHER PUBLICATIONS

Shaikh, Junaid M. E-commerce impact: emerging technology—electronic auditing. Managerial Auditing Journal, v20n4, p. 408-421, 2005 (includes Charts Illustrations Tables References).*

* cited by examiner

*Primary Examiner* — F. Zeender
*Assistant Examiner* — Fawaad Haider
(74) *Attorney, Agent, or Firm* — Æon Law; Adam L.K. Philipp

(57) ABSTRACT

A private equity accounting and reporting system and method are provided herein.

17 Claims, 28 Drawing Sheets

Sample Fund Name
PARTNER CAPITAL ACCOUNT SUMMARY
Twelve Months Ended 09/30/2006
*(Unaudited)*

Partner: Example Limited Partner Name

Partner Subscription Summary:

| | |
|---|---|
| Initial Subscription | $ 12,500,000 |
| Contributions to Date | 2,269,475 |
| Remaining Subscription | $ 10,230,525 |

| | Three Months Ended 31-Dec-2005 | Three Months Ended 31-Mar-2006 | Three Months Ended 30-Jun-2006 | Three Months Ended 30-Sep-2006 | Twelve Months Ended 30-Sep-2006 | Fund to Date Thru 30-Sep-2006 |
|---|---|---|---|---|---|---|
| Partner Capital Account Summary: | | | | | | |
| Beginning Account Balance | $ - | $ XXX,XXX | $ XXX,XXX | $ XXX,XXX | $ XXX,XXX | $ XXX,XXX |
| Contributions ** | XXX,XXX | XXX,XXX | XXX,XXX | XXX,XXX | XXX,XXX | XXX,XXX |
| Syndication costs | (X,XXX) | (X,XXX) | (X,XXX) | (X,XXX) | (X,XXX) | (X,XXX) |
| Investment income (loss) | (XX,XXX) | (XX,XXX) | (XX,XXX) | (XX,XXX) | (XX,XXX) | (XX,XXX) |
| Net realized gain (loss) on portfolio investments | - | - | - | - | - | - |
| Net unrealized appreciation (depreciation) | XXX,XXX | XXX,XXX | XXX,XXX | XXX,XXX | XXX,XXX | XXX,XXX |
| Cash distributions | - | - | - | - | - | - |
| Transfers | - | - | - | - | - | - |
| Ending Account Balance | $ XXX,XXX | $ XXX,XXX | $ XXX,XXX | $ XXX,XXX | $ XXX,XXX | $ XXX,XXX |

** Includes interest equivalent contributions of  $ XX,XXX

Fig. 10

Sample Fund Name
Portfolio Summary
Activity Through 06/30/06
Amounts in $000

| Company Name | Date of Initial Investment | Sector | Industry | Amount Invested | Total Value | Multiple of Investment | Gross IRR |
|---|---|---|---|---|---|---|---|
| Acme Company | Apr-06 | Clean Tech | Solar services | 12,873.3 | 15,000.0 | 1.17 | 34.3% |
| Bank on This Co. | Mar-06 | Finance | Financial services | 1,594.8 | 1,594.8 | 1.00 | 0.0% |
| Downtown Co. | Apr-06 | Telecom | Wireless infrastructure | 7,500.0 | 7,500.0 | 1.00 | 0.0% |
| Everythings Great Inc. | Feb-06 | Media | Cable programming | 2,114.6 | 2,114.6 | 1.00 | 0.0% |
| Itarod Inc. | Apr-06 | Finance | Portfolio management | 4,603.9 | 4,603.9 | 1.00 | 0.0% |
| Kan Doo Company | Dec-05 | Clean Tech | Alternative fuels | 4,461.8 | 6,000.0 | 1.34 | 73.1% |
| New Deal in Town Inc. | Mar-06 | Telecom | Broadband technologies | 3,081.4 | 3,081.4 | 1.00 | 0.0% |
| Pick Me Up Inc. | May-06 | Health Care | Ambulatory services | 2,000.0 | 2,000.0 | 1.00 | 0.0% |
| Really Small Deal Inc. | Dec-05 | Media | Broadcasting technologies | 500.0 | - | - | NA |
| Tearin It Up Company | Aug-05 | Health Care | Alternative medicines | 5,000.0 | 10,000.0 | 2.00 | 217.4% |
| Triple Play Co. | Nov-05 | Telecom | Broadband services | 659.3 | 659.3 | 1.00 | 0.0% |
| | | | | $ 44,389.3 | $ 52,554.1 | 1.18 | 54.1% |
| Return on Invested Capital | | | | | | | |

Fig. 11

Sample Fund Name
Return Analysis
As of 06/30/2006
Amounts in $000

Return on Invested Capital

| Company Name | Date of Initial Investment | Amount Invested | Proceeds Received | Remaining Value | Total Value | Multiple of Investment | Rate of Return |
|---|---|---|---|---|---|---|---|
| Bank on This Co. | Mar-06 | $ 1,594.8 | $ - | $ 1,594.8 | $ 1,594.8 | 1.00 | |
| Downtown Co. | Apr-06 | 7,500.0 | - | 7,500.0 | 7,500.0 | 1.00 | |
| Everythings Great Inc. | Feb-06 | 2,114.6 | - | 2,114.6 | 2,114.6 | 1.00 | |
| Itarod Inc. | Apr-06 | 4,603.9 | - | 4,603.9 | 4,603.9 | 1.00 | |
| Kan Doo Company | Dec-05 | 4,461.8 | - | 6,000.0 | 6,000.0 | 1.34 | |
| New Deal in Town Inc. | Mar-06 | 3,081.4 | - | 3,081.4 | 3,081.4 | 1.00 | |
| Pick Me Up Inc. | May-06 | 2,000.0 | - | 2,000.0 | 2,000.0 | 1.00 | |
| Really Small Deal Inc. | Oct-05 | 500.0 | - | - | - | - | |
| Tearin It Up Company | Aug-05 | 5,000.0 | 2,500.0 | 7,500.0 | 10,000.0 | 2.00 | |
| Triple Play Co. | Nov-05 | 659.3 | - | 659.3 | 659.3 | 1.00 | |
| Return on Invested Capital | | $ 31,515.9 | $ 2,500.0 | $ 35,054.1 | $ 37,554.1 | 1.19 | 54.1% |

1200 — 1205

Net Internal Rate of Return

| Capital Account Activity | Limited Partners | All Partners |
|---|---|---|
| Cumulative cash contributions from partners | $ 41,331.3 | $ 43,693.6 |
| Total value to partners | 39,662.9 | 43,050.3 |
| Net return multiple | 1.04 | 1.01 |
| Net internal rate of return | 3.00% | 6.41% |

Sample Fund Name
*Gross IRR Analysis*
*Activity Through 06/30/06*
Amounts in $000

| | | Return on Invested Capital | | | | |
|---|---|---|---|---|---|---|
| Company Name | Date of Initial Investment | Amount Invested | Proceeds Received | Remaining Value | Total Value | Multiple of Investment | Rate of Return |
| Bank on This Co. | Mar-06 | 1,594.8 | - | 1,594.8 | 1,594.8 | 1.00 | |
| Downtown Co. | Apr-06 | 7,500.0 | - | 7,500.0 | 7,500.0 | 1.00 | |
| Everythings Great Inc. | Feb-06 | 2,114.6 | - | 2,114.6 | 2,114.6 | 1.00 | |
| Itarod Inc. | Apr-06 | 4,603.9 | - | 4,603.9 | 4,603.9 | 1.00 | |
| Kan Doo Company | Dec-05 | 4,461.8 | - | 4,461.8 | 4,461.8 | 1.00 | |
| New Deal in Town Inc. | Mar-06 | 3,081.4 | - | 3,081.4 | 3,081.4 | 1.00 | |
| Pick Me Up Inc. | May-06 | 2,000.0 | - | 2,000.0 | 2,000.0 | 1.00 | |
| Really Small Deal Inc. | Oct-05 | 500.0 | - | - | - | - | |
| Tearin It Up Company | Aug-05 | 5,000.0 | - | 5,000.0 | 5,000.0 | 1.00 | |
| Triple Play Co. | Nov-05 | 659.3 | - | 659.3 | 659.3 | 1.00 | |
| Return on Invested Capital | | $ 31,515.9 | $ - | $ 31,015.9 | $ 31,015.9 | 0.98 | -4.09% |

*Fig. 13*

Sample Fund Name
Transaction Detail for Axel Company
Activity Through 12/31/07

1400

| Company / Security | Date | Transaction Description | Fund Entity 1 | Fund Entity 2 | Fund Entity 3 | Total |
|---|---|---|---|---|---|---|
| Apple Company | | | | | | |
| *8.25% Convertible promissory note* | | | | | | |
| | 04/30/07 | Debt Investments | 300,403.69 | 36,961.31 | 2,635.00 | 340,000.00 |
| | 06/01/07 | Bridge Repayment | (300,403.69) | (36,961.31) | (2,635.00) | (340,000.00) |
| | | Subtotal - 8.25% Convertible promissory note | - | - | - | - |
| | | Allocation of 8.25% Convertible promissory note | NA | NA | NA | NA |
| Grand Total for Apple Company | | | - | - | - | - |
| Allocation of Apple Company | | | NA | NA | NA | NA |
| Axel Company | | | | | | |
| *Series A preferred shares* | | | | | | |
| | 06/01/07 | Equity Investments | 459,090.00 | 56,485.00 | 4,027.00 | 519,602.00 |
| | 10/01/07 | Equity Investments | 113,598.00 | 13,977.00 | 996.00 | 128,571.00 |
| | | Subtotal - Series A preferred shares | 572,688.00 | 70,462.00 | 5,023.00 | 648,173.00 |
| | | Allocation of Series A preferred shares | 88.35% | 10.87% | 0.77% | 100.00% |
| Grand Total for Axel Company | | | 572,688.00 | 70,462.00 | 5,023.00 | 648,173.00 |
| Allocation of Axel Company | | | 88.35% | 10.87% | 0.77% | 100.00% |
| Blocker Expense Fundings | | | - | - | - | - |
| GRAND TOTAL | | | 572,688.00 | 70,462.00 | 5,023.00 | 648,173.00 |
| Grand Total for Axel Company | | | | | | |
| Amounts funded excluding blocker expenses | | | 873,091.69 | 107,423.31 | 7,658.00 | 988,173.00 |
| Bridge loan repayments | | | (300,403.69) | (36,961.31) | (2,635.00) | (340,000.00) |
| Net | | | 572,688.00 | 70,462.00 | 5,023.00 | 648,173.00 |

Fig. 14

Sample Fund Name
Schedule of Portfolio Investments
December 31, 2007
*(Unaudited)*

1500

| Description | Shares | Cost | | Fair Value | | Unrealized Appreciation | |
|---|---|---|---|---|---|---|---|
| Privately held: | | | | | | | |
| Bank on This Co. * | | | | | | | |
| Class A preferred units | 10 | $ | 9,968 | $ | 9,968 | $ | - |
| Class A common units | 18,170 | | - | | - | | - |
| | | | 9,968 | | 9,968 | | - |
| Everything's Great Inc. * | | | | | | | |
| Series A preferred stock | 2,341 | | 8,107 | | 10,000 | | 1,893 |
| Kan Doo Company * | | | | | | | |
| Series B preferred stock | 49,162 | | 10,000 | | 10,000 | | - |
| New Deal in Town Inc. * | | | | | | | |
| Series A preferred stock | 21,476 | | 21,304 | | 21,304 | | - |
| Common stock | 6,059 | | 4,954 | | 4,954 | | - |
| | | | 26,258 | | 26,258 | | - |
| Triple Play Co * | | | | | | | |
| Class A preferred stock | 2,770 | | 2,770 | | 2,770 | | - |
| Class A common stock | 7,970 | | 8 | | 8 | | - |
| | | | 2,778 | | 2,778 | | - |
| Total Portfolio Investments | | $ | 57,111 | $ | 59,004 | $ | 1,893 |

* Greater than 5% of net assets at December 31, 2007

*Fig. 15*

Sample Fund Name
Portfolio Investments By User-Defined Period - Including Blocker Fundings
Activity From 04/01/06 to 06/30/06

1600

| Month Portfolio Company | Security | Date | Your Partnership Name 1 | Your Partnership Name 2 | Your Partnership Name 3 | Total |
|---|---|---|---|---|---|---|
| *Month Ended 04/30/2006* | | | | | | |
| Downtown Co. | Preference shares | 04/11/06 | 6,608,974 | 813,151 | 77,875 | 7,500,000 |
| Itarod Inc. | Series A preferred stock | 04/28/06 | 91,729 | 11,286 | 898 | 103,913 |
| Itarod Inc. | Series A-1 preferred stock | 04/24/06 | 3,972,365 | 488,749 | 38,886 | 4,500,000 |
| | Monthly Subtotal | | 10,673,068 | 1,313,186 | 117,659 | 12,103,913 |
| *Month Ended 05/31/2006* | | | | | | |
| Pick Me Up Inc. | Option on Class B common units | 05/30/06 | 1,766,638 | 217,362 | 16,000 | 2,000,000 |
| | Monthly Subtotal | | 1,766,638 | 217,362 | 16,000 | 2,000,000 |
| *Month Ended 06/30/2006* | | | | | | |
| Everything's Great Inc. | Series A preferred stock | 06/23/06 | 934,260 | 114,950 | 8,107 | 1,057,317 |
| | Monthly Subtotal | | 934,260 | 114,950 | 8,107 | 1,057,317 |
| PERIOD TOTAL TO PORTFOLIO COMPANIES | | | 13,373,966 | 1,645,499 | 141,766 | 15,161,230 |

*Fig. 16*

Sample Fund Name
Realization By User-Defined Period
Activity From 04/01/07 to 06/30/07

| Month Portfolio Company | Date | Cash Proceeds | AR for Securities Sold | Total Proceeds | Cost | Realized Gain (Loss) |
|---|---|---|---|---|---|---|
| *Month Ended 06/30/2007* | | | | | | |
| ABC Company | 06/18/08 | 150,250 | - | 150,250 | 60,652 | 89,598 |
| Another Good Deal, Inc. | 06/25/08 | 4,810,000 | 2,690,000 | 7,500,000 | 3,200,000 | 4,300,000 |
| Winning Deal, Inc. | 06/30/08 | 4,716,000 | 1,520,000 | 6,236,000 | 4,250,000 | 1,986,000 |
| | | 9,676,250 | 4,210,000 | 13,886,250 | 7,510,652 | 6,375,598 |
| PERIOD TOTAL REALIZATIONS | | 9,676,250 | 4,210,000 | 13,886,250 | 7,510,652 | 6,375,598 |
| | | 9,676,250 | 4,210,000 | 13,886,250 | 7,510,652 | 6,375,598 |

Entities Included in This Report:
Sample Fund Entity Name

Sample Fund Entity Name
Statement of Assets, Liabilities and Partners' Capital
December 31, 2007
(Unaudited)

1800

Assets

Portfolio investments, at fair value (cost of $000,000)
Cash and cash equivalents
Other current assets
    Total assets

Liabilities

Accounts payable and accrued expenses
Revolving demand note payable
    Total liabilities Net assets    $  -

Net Assets Represented by Partners' Capital

Partners' contributed capital
Partners' distributions
Cumulative investment performance:
  Net investment gain
  Net realized gain from portfolio investments
  Net unrealized appreciation on portfolio investments
    Decrease in net assets resulting from operations Net assets represented by partners' capital  $  -

*Fig. 18*

Sample Fund Entity Name
Statement of Operations
Three and Twelve Months Ended December 31, 2007
(Unaudited)

← 1900

| | Quarter | YTD |
|---|---|---|
| Investment income: | | |
| Dividend income | $ - | $ - |
| Interest income | - | - |
| Total income | - | - |
| | | |
| Expenses: | | |
| Management fees | - | - |
| Other professional fees | - | - |
| Interest expense | - | - |
| Other expenses | - | - |
| Total expenses | - | - |
| Net investment loss | - | - |
| | | |
| Realized and unrealized loss from portfolio investments | | |
| Net realized gain (loss) from portfolio investments | - | - |
| Net unrealized (appreciation) depreciation on portfolio investments | - | - |
| Net gain (loss) from portfolio investments | - | - |
| | | |
| Net increase in net assets resulting from operations | $ - | $ - |

Fig. 19

Sample Fund Entity Name
Partner Capital Account Activity
For Quarter Ended 12/31/2007

— 2100

| Prt ID | Partner Short Name | Beginning Balance | Contributions | Syndication Costs | Net Investment Income (Loss) | Realized Gain (Loss) from Investments | Unrealized Appreciation (Depreciation) on Investments | Cash Distributions | Stock Distributions | Transfers | Ending Balance |
|---|---|---|---|---|---|---|---|---|---|---|---|
| *Limited Partners* | | | | | | | | | | | |
| P502 | XYZ Pension Plan | - | - | - | - | - | - | - | - | - | - |
| P503 | ABC Family Trust | - | - | - | - | - | - | - | - | - | - |
| P504 | A Big University Endowment | - | - | - | - | - | - | - | - | - | - |
| | Limited Partners Subtotal | $ - | $ - | $ - | $ - | $ - | $ - | $ - | $ - | $ - | $ - |
| *General Partner* | | | | | | | | | | | |
| P101 | General Partner | - | - | - | - | - | - | - | - | - | - |
| | GRAND TOTAL - Limited Partners | $ - | $ - | $ - | $ - | $ - | $ - | $ - | $ - | $ - | $ - |

*Fig. 21*

Your Partnership Name 2
Condensed Schedule of Portfolio Investments
As of 06/30/2006

| Cost | Cost | Fair Value | Fair Value as a % of Net Assets |
|---|---|---|---|
| Summary by Category: | | | |
| Services companies | 2,000,000 | 2,500,000 | 38.46% |
| Technology companies | 3,000,000 | 2,890,000 | 44.46% |
| Total | 5,000,000 | 5,390,000 | 82.92% |
| Summary by Sector: | | | |
| Health care | 2,000,000 | 2,290,000 | 35.23% |
| Clean tech | 1,500,000 | 1,600,000 | 24.62% |
| Media | 1,000,000 | 1,000,000 | 15.38% |
| Communications | 500,000 | 500,000 | 7.69% |
| Total | 5,000,000 | 5,390,000 | 82.92% |
| Summary by Type of Security: | | | |
| Preferred stock | 3,000,000 | 3,390,000 | 52.15% |
| LLC interests | 1,000,000 | 1,000,000 | 15.38% |
| Common stock | 500,000 | 500,000 | 7.69% |
| Promissory notes | 500,000 | 500,000 | 7.69% |
| Total | 5,000,000 | 5,390,000 | 82.92% |

Sample Fund Name
Treasury Status Report
*Activity Through 07/31/2006*

| Line Item | Your Partnership Name 1 | Your Partnership Name 2 | Your Partnership Name 3 | Total | Available LOC |
|---|---|---|---|---|---|
| Cash | 4,003,745 | 1,041,392 | 45,489 | 5,090,625 | |
| Capital Calls Receivable | 302,450 | 0 | 8,500 | 310,950 | |
| Notes Payable | - | - | 60,000 | 60,000 | 4,940,000 |
| Capital call payable | - | - | - | - | |
| Other Due to (from) Affiliates: | | | | | |
|   Affiliate Entity Name 1 | 2,115 | - | - | 2,115 | |
|   Affiliate Entity Name 2 | - | - | - | - | |
|   Affiliate Entity Name 3 | - | - | 5,187 | 5,187 | |
|   Affiliate Entity Name 4 | 29,520 | 13,298 | 2,763 | 45,581 | |
| Total Due to (from) Affiliates | 31,635 | 13,298 | 7,950 | 52,883 | |

Sample Fund Name
Summary of Amounts Funded by Deal
Activity Through 06/30/06

— 2400

| Deal | First Invested | Your Partnership Name 1 (2405A) | Your Partnership Name 2 (2405B) | Your Partnership Name 3 (2405C) | Total Invested | % of Portfolio |
|---|---|---|---|---|---|---|
| Bank on This Co. | 03/17/06 | 1,411,236 | 173,635 | 9,968 | 1,594,839 | 5.06% |
| Downtown Co. | 05/15/06 | 6,608,974 | 813,151 | 77,875 | 7,500,000 | 23.80% |
| Everythings Great Inc. | 01/31/06 | 1,868,521 | 229,899 | 16,214 | 2,114,634 | 6.71% |
| Itarod Inc. | 04/24/06 | 4,064,094 | 500,035 | 39,784 | 4,603,913 | 14.61% |
| Kan Doo Company | 12/09/05 | 3,964,113 | 487,734 | 10,000 | 4,461,847 | 14.16% |
| New Deal in Town Inc. | 03/08/06 | 2,720,425 | 334,713 | 26,258 | 3,081,397 | 9.78% |
| Pick Me Up Inc. | 05/30/06 | 1,766,638 | 217,362 | 16,000 | 2,000,000 | 6.35% |
| Really Small Deal Inc. | 10/05/05 | 445,221 | 54,779 | - | 500,000 | 1.59% |
| Tearin It Up Company | 08/26/05 | 4,452,212 | 547,788 | - | 5,000,000 | 15.86% |
| Triple Play Co. | 11/22/05 | 584,595 | 71,928 | 2,778 | 659,300 | 2.09% |
| Fund Total | | 27,886,029 | 3,431,025 | 198,877 | 31,515,931 | 100.00% |
| | | 88.48% | 10.89% | 0.63% | 100.00% | |

** This schedule excludes blocker expense fundings.

*Fig. 24*

Sample Fund Name
Funding Detail - Example, Inc.
Activity Through 10/31/06

2500

| Company / Security Date | ********** DOLLARS ********** | | | | ********** SHARES ********** | | | |
|---|---|---|---|---|---|---|---|---|
| | Fund Entity 1 Name | Fund Entity 2 Name | Fund Entity 3 Name | Total | Fund Entity 1 Name | Fund Entity 2 Name | Fund Entity 3 Name | Total |
| Example, Inc. | | | | | | | | |
| *Series B preferred stock* | | | | | | | | |
| 08/26/05 | 5,000,000.28 | - | - | 5,000,000.28 | 3,434,302 | - | - | 3,434,302 |
| 09/26/05 | - | 750,809.09 | - | | - | 515,701 | - | |
| 09/29/05 | (750,809.09) | | | | | | | |
| 03/03/06 | 203,020.89 | (203,020.89) | | | (515,701) | (139,447) | | |
| | | | | | 139,447 | | | |
| Subtotal - Series B preferred stock | 4,452,212.08 | 547,788.20 | - | 5,000,000.28 | 3,058,048 | 376,254 | - | 3,434,302 |
| Allocation of Series B preferred stock | 89.04% | 10.96% | 0.00% | 100.00% | 89.04% | 10.96% | 0.00% | 100.00% |
| *Series C preferred stock* | | | | | | | | |
| 10/18/06 | 1,624,145.76 | 199,829.13 | 11,471.77 | 1,835,446.66 | 941,916 | 115,890 | 6,653 | 1,064,459 |
| Subtotal - Series C preferred stock | 1,624,145.76 | 199,829.13 | 11,471.77 | 1,835,446.66 | 941,916 | 115,890 | 6,653 | 1,064,459 |
| Allocation of Series C preferred stock | 88.49% | 10.89% | 0.63% | 100.00% | 88.49% | 10.89% | 0.63% | 100.00% |
| Grand Total for Example, Inc. | $ 6,076,357.84 | $ 747,617.33 | $ 11,471.77 | $ 6,835,446.94 | 3,999,964 | 492,144 | 6,653 | 4,498,761 |
| Allocation of Example, Inc. | 88.89% | 10.94% | 0.17% | 100.00% | 88.91% | 10.94% | 0.15% | 100.00% |

*Fig. 25*

Sample Fund Name
Statement of Operations Detail
FTD Activity Through 12/31/06

— 2700

| Type | Portfolio Company | Your Partnership 1 | Your Partnership 2 | Your Partnership 3 | Total |
|---|---|---|---|---|---|
| Portfolio Interest Income: | | | | | |
| | Kan Doo Company | 15,571 | 1,916 | 39 | 17,526 |
| | Pick Me Up Inc. | 2,883 | - | 26 | 2,909 |
| | Subtotal - Portfolio Interest Income | 18,454 | 1,916 | 65 | 20,435 |
| Net Realized Gain (Loss): | | | | | |
| | Really Small Deal Inc. | (445,221) | (54,779) | - | (500,000) |
| | Subtotal - Net Realized Gain (Loss) | (445,221) | (54,779) | - | (500,000) |
| Net Unrealized Appreciation (Depreciation): | | | | | |
| | Tearin It Up Company | 835,459 | 102,793 | - | 938,251 |
| | Subtotal - Net Unrealized App (Dep) | 835,459 | 102,793 | - | 938,251 |
| Total Portfolio Activity | | 408,691 | 49,930 | 65 | 458,686 |
| Other (Non-Portfolio) Activity: | | | | | |
| | Bank interest income | 110,957 | 33,778 | - | 144,735 |
| | Other dividend income | - | - | - | - |
| Other Activity | | 110,957 | 33,778 | - | 144,735 |
| GRAND TOTAL | | 519,649 | 83,708 | 65 | 603,422 |

Fig. 27

Sample Fund Name
Weekly Dashboard - All Amounts in $M
Activity Through 11/11/2006

2800

| Sector | Committed | Invested | Unfunded Commitment | Reserves | Total Remaining | Total Commitments & Reserves |
|---|---|---|---|---|---|---|
| Sector A | $20.0 | $18.0 | $2.0 | $10.0 | $12.0 | $30.0 |
| Sector B | 17.0 | 17.0 | - | 5.0 | 5.0 | 22.0 |
| Sector C | 30.0 | 25.0 | 5.0 | 20.0 | 25.0 | 50.0 |
| Sector D | 12.0 | 10.0 | 2.0 | 5.0 | 7.0 | 17.0 |
| Fund Total | $79.0 | $70.0 | $9.0 | $40.0 | $49.0 | $119.0 |

Committed by Sector
- Sector A 25%
- Sector B 22%
- Sector C 38%
- Sector D 15%

Committed & Reserved by Sector
- Sector A 25%
- Sector B 18%
- Sector C 43%
- Sector D 14%

| Company | Committed | Invested | % of Fund Commitments | Reserves | Lead Partner | 2nd Partner |
|---|---|---|---|---|---|---|
| Five Largest Commitments | | | | | | |
| Company name #1 | $10.0 | $8.0 | 12.7% | $5.0 | Smith | Jones |
| Company name #2 | 8.5 | 8.5 | 10.8% | 3.0 | Alexander | Frank |
| Company name #3 | 8.0 | 6.0 | 10.1% | 2.0 | Olson | Cash |
| Company name #4 | 7.5 | 7.5 | 9.5% | 11.0 | Carlin | Smith |
| Company name #5 | 6.8 | 6.8 | 8.6% | 2.2 | Cash | Frank |
| Total | $40.8 | $36.8 | 51.6% | $23.2 | | |

| | | |
|---|---|---|
| Total Available | | $250.0 |
| Committed & Reserved | | 119.0    48% |
| Available | | $131.0    52% |

Recent Portfolio Activity
| | | |
|---|---|---|
| Company A | 11/02/06 | $ 1.3 |
| Company B | 10/27/06 | 1.0 |
| Company C | 10/27/06 | 1.2 |
| Company D | 10/18/06 | 1.8 |
| Company E | 10/11/06 | 0.4 |
| Company F | 10/06/06 | 2.0 |
| Company G | 09/27/06 | 1.2 |
| Company H | 09/01/06 | 1.5 |
| Company I | 08/31/06 | 2.0 |
| Company B | 08/30/06 | 1.1 |
| Company G | 08/30/06 | 1.0 |
| Company C | 08/24/06 | 0.5 |

| | Entity 1 | Entity 2 |
|---|---|---|
| Cash | $ 0.0 | $ 1.7 |
| Cap Call AR | 1.2 | - |
| | $ 1.2 | $ 1.7 |
| LOC Available | $ 10.0 | |

*Fig. 28*

PRIVATE EQUITY ACCOUNTING AND REPORTING SYSTEM AND METHOD

FIELD

The present disclosure relates to accounting and reporting specialized data for private equity funds, and more particularly for a method of configuring a general ledger to facilitate industry-specific reporting.

COPYRIGHT NOTICE

A portion of the disclosure of this patent document may contain material that is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Private equity ("PE") firms typically raise capital in a series of limited-life, closed-end funds. Each fund may typically be a group of separate legal investment entities, each of which is often structured as a limited partnership and formed to address the specific tax structuring needs of significant investor groups (such as tax exempt and foreign investors), to provide special economic arrangements to distinct investor classes, or to segregate investors by the Investment Company Act of 1940 definitions (i.e., Qualified Purchasers vs. Accredited Investors). During fundraising, investor entities (who are often limited partners) typically enter into a subscription agreement committing them to contribute a certain amount over the life of the investment entity in exchange for an agreed-upon share of the investment proceeds realized by the investment entity. As investments are made, the PE firm (who often serves as the general partner or "GP" of the investment entity) typically calls capital from the investor entities, who often participate in each of the investment entity's investments prorata based on relative subscriptions. In a typical fund, investments may be made in 20 to 50 investment targets (which may be operating companies or other investment pools). As investments are realized, proceeds are typically distributed in accordance with the terms of the partnership agreement. The PE firm may be compensated for its services through both a periodic management fee and a share of the investment entity's profits, known as the "carried interest."

Real estate investment partnerships are considered "PE" firms as the term is used herein.

The nature and structure of PE funds typically requires specialized managerial or internal reporting relative to other enterprises, including the following.

Fund-to-date reporting: Since private equity is a long-term asset class, PE funds may report information on both a fiscal year and life-to-date ("FTD") basis.

Specialized metrics reporting: PE firms may be benchmarked by a number of industry specific metrics such as dollar-weighted returns (referred to as "internal rate of return" or "IRR"), distributions to paid-in ratios, and value to paid-in ratios. IRR is often measured over various dimensions, such as sector, region, initial stage of investment, and investment partner (e.g., the PE firm's employee who is responsible for the investment).

Multi-level reporting: Since a PE fund is comprised of parallel legal entities, results may be reported at both the investment entity and the fund level. Furthermore, since the PE firm may raise capital over a series of funds, existing and potential investor entities may demand firm-level results (i.e., an aggregation of fund level results) when analyzing PE firm performance. The challenge of multi-level reporting depends on the number of entities in each fund and the number of funds raised over time by the PE firm.

Capital account reporting: Unlike an incorporated entity that simply issues entity-level financial reports to its investors, PE funds may issue "capital account" reports to individual investor entities. These reports are typically issued quarterly, and may include the individual partner's capital contributions, distributions, and share of operating activity, including realized and unrealized investment gains and losses. This may require detailed allocations of the investment partnership's operating activity to individual partners based on complex provisions of the limited partnership agreement known as the "waterfall." Since each limited partnership agreement may be negotiated based on prevailing market terms at the time of fundraising and the desired economic terms with each investor class, each of the PE firm's investment entities may have different waterfall allocations. Likewise, classes of investor entities in a single investment entity may have different waterfall allocations.

Ad hoc reporting: A single PE fund may have 300 or more investor entities, including private and governmental pension plans, insurance companies, family trusts, and high net worth individuals. These investor entities may employ portfolio managers who allocate the investor entity's investments across various asset classes and to individual investment firms within each asset class. As these portfolio managers perform their individual analysis, they may make a number of ad hoc information requests to the PE firm. Accordingly, the PE firm may be asked to report the same information in various formats as prescribed by each investor entity.

"Family" or "Cross-fund" capital account reporting: An investor may have multiple legal investor entities through which it invests in the investment partnership. For example, a wealthy family may have a separate trust for each child. Each trust may be treated as a separate investor entity and may receive its own capital account report from the investment partnership. Such investors frequently ask for a "family" level report (i.e., an aggregation of the individual capital accounts) for monitoring purposes. Similarly, a single investor entity frequently commits to a number of the PE firm's funds over time and may request a consolidated capital account report that aggregates its capital account activity across several of the PE firm's investment partnerships.

Period specific reporting: Although many investment entities operate on a December 31 fiscal year, investor entities may operate on either a June 30 or September 30 fiscal year. Investor entities may therefore request capital account information for their fiscal year rather than the investment partnership's fiscal year. Accordingly, the PE firm may wish to report information for user-defined periods, which may cross the fiscal year of the investment partnership.

Tax reporting: Limited partnerships are typically tax transparent entities—i.e., the partnership is not responsible for paying tax on its taxable income. Instead, the partnership may file an informational return (Form 1065) and may issue a Schedule K-1 to each partner (i.e., investor entity) that details the partner's share of taxable activity to be reported on the partner's tax return. The PE firm may therefore maintain tax as well as financial capital accounts that adhere to Generally Accepted Accounting Principles ("GAAP") by individual investor entity. Tax and GAAP capital accounts may differ because of book and tax differences, which are reported on Schedule M-1 of the Form 1065 ("M-1 differences").

Using the common approach, a PE firm bookkeeper may need to consult only one general ledger account for the balance of an investment or one general ledger account for the capital account balance of an investor entity. However, using the common approach, it may be relatively difficult to produce many of the specialized reports described above. Accordingly, it is common for PE firms to keep at least one parallel set of books—one in general ledger software, and one in a set of spreadsheets. In such firms, the general ledger software is typically used for financial and regulatory reporting, while the spreadsheets are typically used for managerial and/or internal reporting.

BRIEF DESCRIPTION OF THE DRAWINGS

FIG. 10 is an exemplary Partner Capital Account Summary report in accordance with one embodiment.

FIG. 11 is an exemplary Portfolio Summary report in accordance with one embodiment.

FIG. 12 is an exemplary Returns Analysis report in accordance with one embodiment.

FIG. 13 is an exemplary Gross IRR Analysis report in accordance with one embodiment.

FIG. 14 is an exemplary Transaction Detail report in accordance with one embodiment.

FIG. 15 is an exemplary Schedule of Portfolio Investments report in accordance with one embodiment.

FIG. 16 is an exemplary Portfolio Investments for Specified Period report in accordance with one embodiment.

FIG. 17 is an exemplary Realizations Report for Specified Period in accordance with one embodiment.

FIG. 18 is an exemplary Statement of Assets, Liabilities, and Partners' Capital report in accordance with one embodiment.

FIG. 19 is an exemplary Statement of Operations report in accordance with one embodiment.

FIG. 21 is an exemplary Partners Capital Account Activity report in accordance with one embodiment.

FIG. 22 is an exemplary Condensed Schedule of Portfolio Investments report in accordance with one embodiment.

FIG. 23 is an exemplary Treasury Status report in accordance with one embodiment.

FIG. 24 is an exemplary Deal Summary report, in accordance with one embodiment.

FIG. 25 is an exemplary Funding Detail report in accordance with one embodiment.

FIG. 27 is an exemplary Statement of Operations Detail report in accordance with one embodiment.

FIG. 28 is an exemplary "Dashboard" report in accordance with one embodiment.

DESCRIPTION

Figure 1:
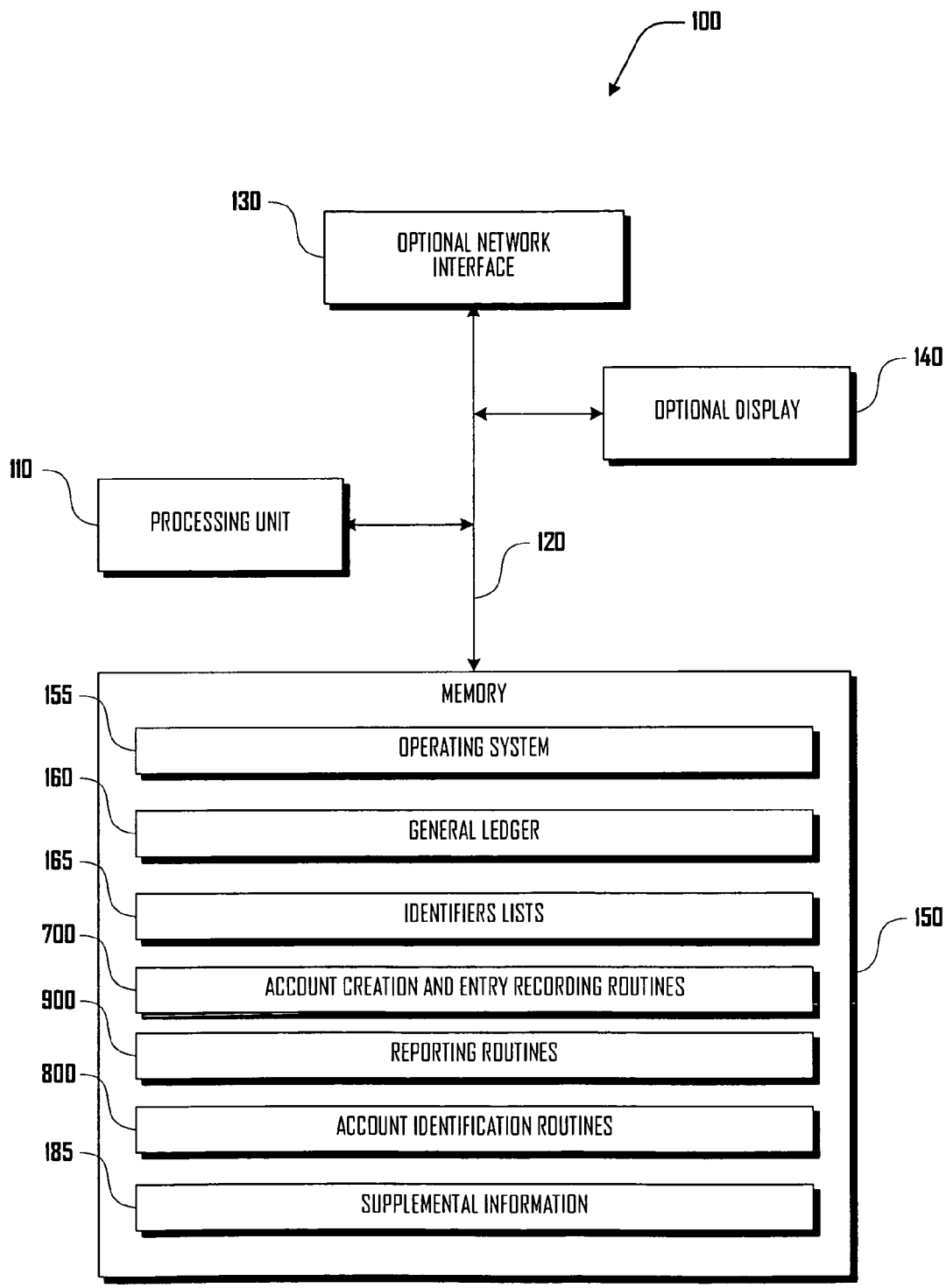
FIG. 1 is a diagram illustrating an exemplary PE accounting/reporting device in accordance with one embodiment.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates several components of an exemplary PE accounting/reporting device 100. In other embodiments, a PE accounting/reporting device 100 may include many more components than those shown in FIG. 1. However, it is not necessary that all of these generally conventional components be shown in order to disclose an enabling embodiment. As shown in FIG. 1, the PE accounting/reporting device 100 includes an optional network interface 130 for connecting to remote devices. If present, the network interface 130 may be a network interface designed to support a local area network (LAN), wireless local area network (WLAN), personal area network (PAN), telephone network, powerline connection, serial bus, universal serial bus (USB) wireless connection, or the like. The optional network interface 130 includes the necessary circuitry, driver and/or transceiver for such a connection and is constructed for use with the appropriate protocols for such a connection.

The PE accounting/reporting device 100 also includes a processing unit 110, an optional display 140, and a memory 150, all interconnected along with the optional network interface 130 via a bus 120. Those of ordinary skill in the art and others will appreciate that the display 140 may not be necessary in all forms of computing devices and, accordingly, is an optional component. The memory 150 generally comprises random access memory ("RAM"), a read only memory ("ROM"), and a permanent mass storage device, such as a disk drive, flash RAM, or the like. The memory 150 stores the program code and/or data storage necessary for implementing a general ledger accounting system 160, a list of segment identifiers 165, account creation and entry recording routines 700, reporting routines 900, account identification routines 800, and a supplemental information data source 185. Additionally, the memory 150 stores an operating system 155.

These and similar software components may be loaded from a computer readable medium into memory 150 of the PE accounting/reporting device 100 using a drive mechanism (not shown) or network mechanism (not shown) associated with the computer readable medium, such as a floppy, tape, DVD/CD-ROM drive, flash RAM, or network interface card.

Although a conventional gene-purpose computing device may be transformed via software into a PE accounting/reporting device 100 as described, a PE accounting/reporting device 100 may also be embodied on a great number of devices capable of recording and reporting accounting entries. For example, in alternate embodiments, a PE accounting/reporting device 100 may be embodied on a mobile phone, personal digital assistant, personal computer, or the like.

Figure 2:
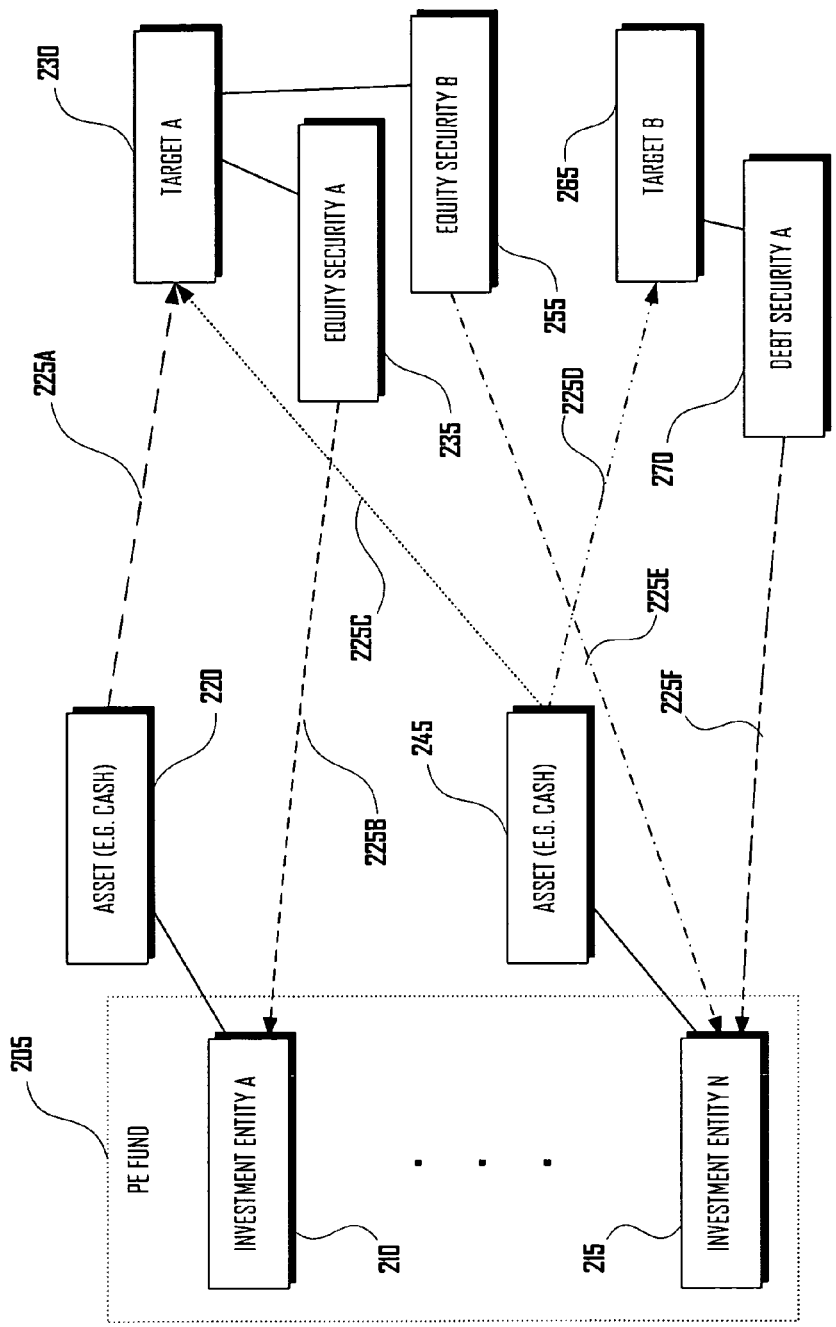
FIG. 2 is a diagram conceptually illustrating a series of exemplary equity investment transactions in accordance with one embodiment.

FIG. 2 is a diagram conceptually illustrating a series of exemplary equity transactions in accordance with one embodiment. One or more investment entities 210, 215 participate in a PE fund 205. In the illustrated scenario, investment entity A 210 provides an asset that the PE fund 205 used to fund an investment transaction 225A in a particular target (target A) 230 in exchange for which, the PE fund 205 obtains a number of shares of a particular equity security 235 issued by target A 230 in transaction 225B. Similarly, investment entity N 215 provides an asset 245 that is used to fund an investment transaction 225C in target A 230 and an investment transaction 225D in target B 265. In exchange, the PE fund 205 obtains equity securities 255 and debt securities 270 in transactions 225E and 225F, respectively.

Over the life of an investment, such as those illustrated in FIG. 2, there may be a number of additional transactions related to the initial investment. For example, a bridge loan may be converted to a preferred equity security. The preferred equity security may subsequently be converted to common stock of the issuer. Upon exit, the common stock may be exchanged for securities of the acquirer. A PE firm may wish to have a complete history of these transactions for monitoring and analyzing its portfolio. In addition, various transaction types may be processed differently for purposes of various financial and management reports. Accordingly, in one embodiment, each transaction type for a particular investment entity, target, and security may be recorded in a unique account.

Figure 3:
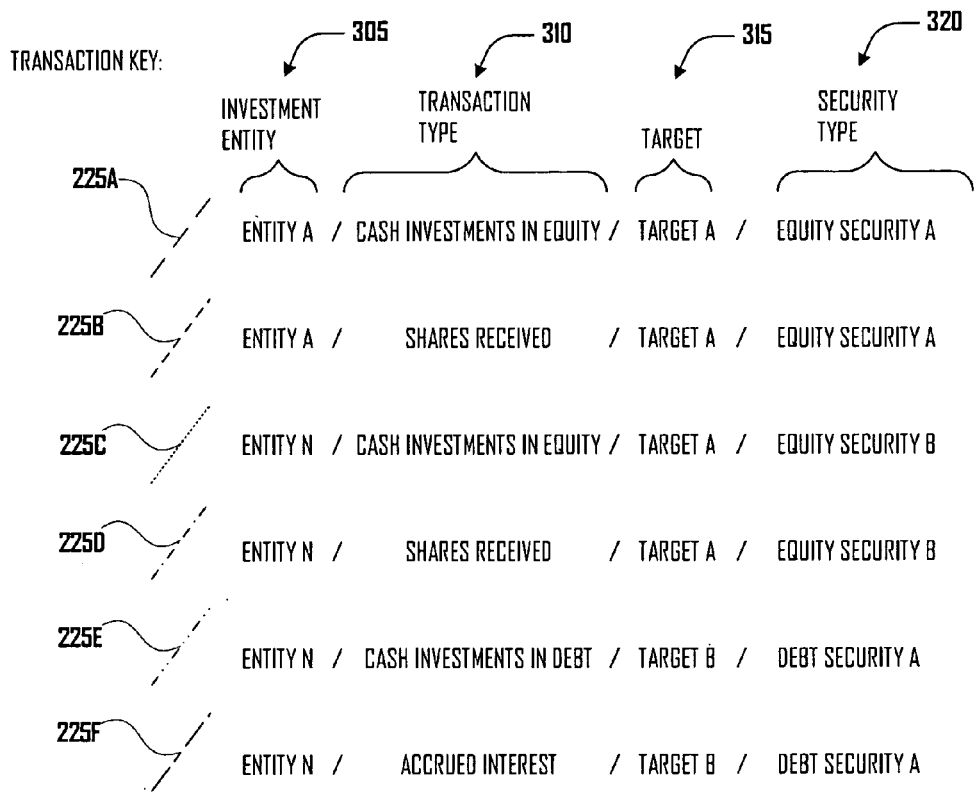
FIG. 3 is a key identifying several unique accounts for transactions illustrated in FIG. 2, in accordance with one embodiment.

FIG. 3 identifies several unique accounts that may be created and used to record transactions 225A-F. Transaction 225A-F are each members of a unique class of transactions that may be characterized as the intersection of several transaction "dimensions." In an exemplary embodiment, there are four "dimensions" representing various transaction parameter classes, including the identity of the investment entity 305, the identity of the investment target 315, the type of security or asset received 320, and the type of transaction within an asset type 310. Thus, as illustrated in FIG. 3, transactions 225A-F may be characterized as six unique intersection points among dimensions 305-320. Put another way, each of transactions 225A-F may be characterized as a unique combination of several (in this case, four) transaction parameter classes 305-320. As discussed below, these and other combinations, similarly derived, may be used to create and identify a multiplicity of general ledger accounts, each used to record accounting entries associated with a particular combination of transaction parameters.

Accordingly, various embodiments, described in more detail below, may enable a PE firm to use the same general ledger accounts that are used for financial reporting to generate some or all of the above-described industry-specific managerial reports, including investment tracking (both invested dollars and units); portfolio statistics and metrics (including gross and net IRR calculations, as applicable) for the firm, fund, entity, or any pre-determined dimension such as sector or geography; individual or family capital account reporting (including capital call calculations and income/loss allocations) by entity or across funds; M-1 difference and tax capital account reporting; and management company reporting. Data rich reports may be generated for pre-determined periods (i.e., quarterly, fiscal year, or FTD) or flexible reporting periods crossing fiscal years.

Some general ledger accounting software may benefit from certain functionality in various report writer solutions, including SAP's XL Reporter ("XLR"), as distributed domestically by Solver, Inc. of Los Angeles, Calif. Such report writers may enable definition of various reports that may be able to draw specifically defined accounting entries from a particularly configured general ledger. Reports may be further presented and manipulated in appropriate software packages, e.g., a spreadsheet software package.

In other embodiments, more or fewer parameter classes may be present. In particular, in other embodiments, further transaction parameter classes may include the sector of the target, the identity of a PE firm employee or associate responsible for the transaction, an investment duration or "active thru" parameter, a publicly-held/privately-held parameter, and an identity of a PE firm partner who is responsible for the transaction. In various embodiments, such additional parameters may be implemented as user-defined fields associated with each general ledger account.

Figure 4:
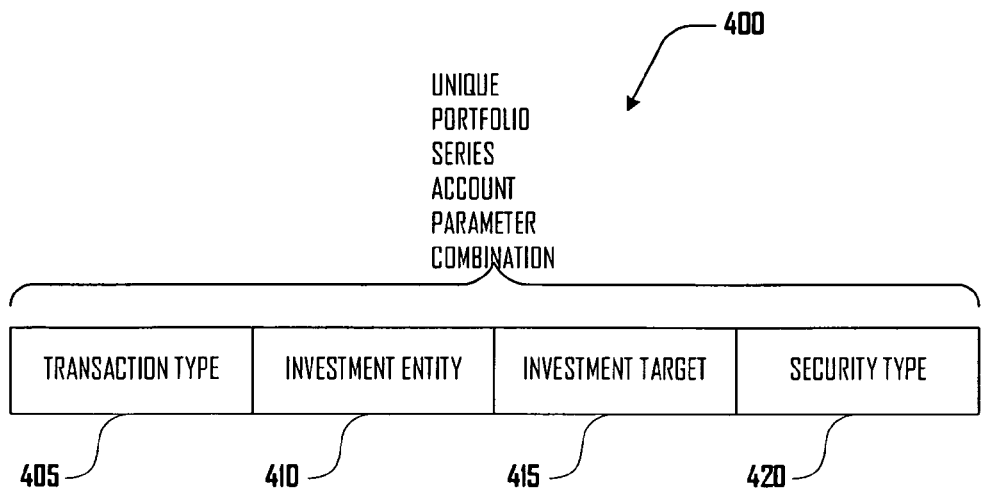
FIG. 4 is a diagram illustrating a combination of segment identifiers that define a unique gain/loss account in accordance with one embodiment.

As illustrated in FIG. 4, the following four parameter classes may be used to create and identify gain/loss accounts in a general ledger: transaction type 405, investment entity 410, investment target 415, and security type 420.

Figure 5:
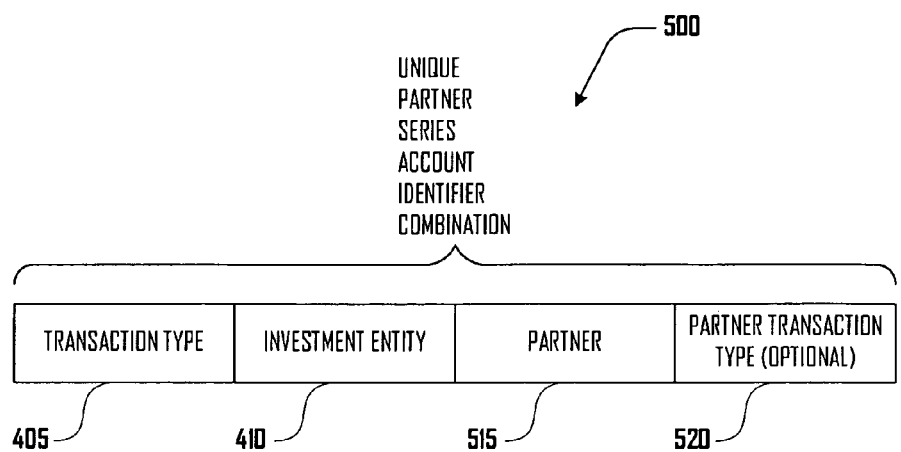
FIG. 5 is a diagram illustrating a combination of segment identifiers that define a unique investor entity (i.e., partner) capital account in accordance with one embodiment.

As illustrated in FIG. 5, the following four parameter classes may be used to create and identify investor capital accounts in a general ledger: transaction type 405, investment entity 410, partner 515, and an optional partner transaction type 520.

Figure 6:
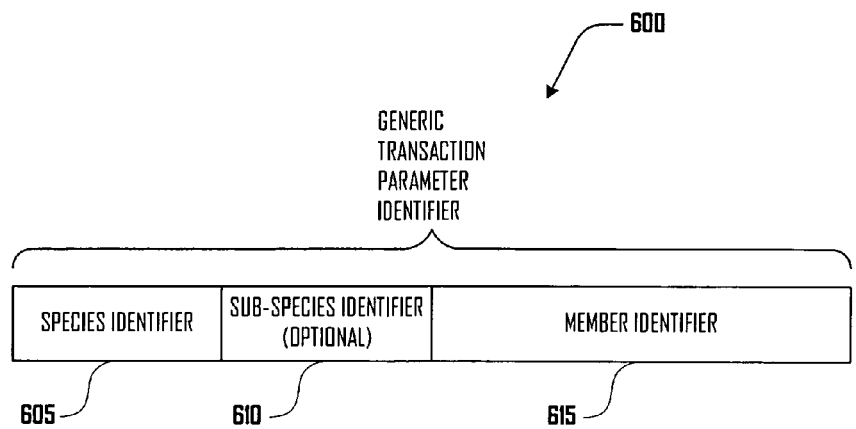
FIG. 6 is a diagram illustrating a generic segment identifier in accordance with one embodiment.

In an exemplary embodiment, a transaction parameter class may have a list of unique identifiers to represent each member of the class. FIG. 6 illustrates an exemplary structure of a generic transaction parameter identifier 600, which includes a species identifier 605, an optional sub-species identifier 610, and a member identifier 615. In one embodiment, an identifier may comprise four or fewer alphanumeric characters. In some cases, an identifier may also lack a species identifier 605, in which case, an identifier would include only a member identifier 615.

Various transaction type classes may include species, sub-species, and members as listed in Tables 1-5, below. Since requirements of each installation may be different, the configuration details that follow are but one embodiment. They are representative of a typical installation, but users will modify the configuration to meet their specific needs.

In one embodiment, transaction type species may comprise the following:

Assets, see Table 1;
Liabilities, see Table 2;
Partners' Capital, see Table 3;
Income, Including Portfolio Gains and Losses, see Table 4; and
Expenses, see Table 5.

The list of transaction types and identifiers in Tables 1-5 is not exhaustive but is representative of the level of detail required for capturing the portfolio activity. Along with lists of representative transaction types, Tables 1-5 also list a set of exemplary four-digit transaction type identifiers, in accordance with one embodiment. In the exemplary embodiment, the first digit of the transaction type identifiers acts as a species identifier 605, the second digit as a sub-species identifier 610 (where appropriate), and the third and fourth digits as a member identifier 615.

TABLE 1

Member definitions for Asset Species (1XXX)

| ID | Description | Definition |
|---|---|---|
| 1000 | Cash | |
| 1100 | Capital calls receivable | |
| 12XX | Debt Investments Sub-species | |
| 1210 | Invested - Debt | Cash fundings only |

TABLE 1-continued

Member definitions for Asset Species (1XXX)

| ID | Description | Definition |
|---|---|---|
| 1211 | Invested - Debt CR adjustments | Special cash adjustments to portfolio company debt fundings. Used principally for final closing true-ups for reduction of investment. |
| 1212 | Invested - Debt DR adjustments | Special cash adjustments to portfolio company debt fundings. Used principally for final closing true-ups for increase in investment. |
| 1219 | OID on funded debt | Contra to Main Segment 1210 to reflect OID on funded debt. Use 1242 for OID on exchange debt. |
| 1220 | Capitalized interest - Debt | Stated interest capitalized as debt principal |
| 1221 | Periodic accreting interest | Periodic accretion of interest |
| 1229 | OID amortization | Accumulated amortization of OID (debit bal) - Use for OID amortization on funded debt only. See 1243 for OID amortization on exchange debt. |
| 1231 | Original Issue Discount | OID on funded (i.e., 121X) debt - Contra account |
| 1232 | OID Amortization | OID amortization on funded debt |
| 1241 | Debt received for equity | Debt received for equity of same issuer. This is the offset to 1341. |
| 1242 | OID on exchange debt | Contra to Main Segment 1241 for OID on exchange (i.e., non-funded) debt |
| 1243 | OID amortization on exchange debt | Accumulated amortization of OID (debit bal) - Use for OID amortization on exchange debt only. |
| 1251 | Bridge converted to debt | Bridge loan converted to another form of debt |
| ☐1255 | Other debt exchanges | Exchange of debt for debt |
| ☐1260 | Bridge converted to equity | Bridge (P&I) converted to equity |
| ☐1261 | Conv debt converted to equity | Other debt (P&I) converted to equity |
| ☐1268 | Contributed debt | In-kind contribution of debt (See 1328) |
| ☐1271 | Debt security repayment | Cash pmt from issuer EXCLUDING Bridge loans |
| ☐1272 | Debt transfer | Cash from sale/transfer of debt to 3rd party |
| ☐1276 | Bridge repayment | Bridge loan repayment |
| ☐1280 | Unrecovered debt | Debt written off |
| ☐1290 | Unrealized adjustments on debt | Unrealized adjustments on debt securities |
| 13XX | Portfolio equity investments sub-species | |
| ☐1310 | Invested - Equity | Cash fundings only |
| ☐1311 | Invested - CR Adjustments | Special cash adjustments to portfolio company equity fundings. Used principally for final closing true-ups for reduction of investment. |
| ☐1312 | Invested - DR Adjustments | Special cash adjustments to portfolio company equity fundings. Used principally for final closing true-ups for increase in investment. |
| ☐1318 | Invested - Other outside basis | Cash fundings for outside basis other than blocker expenses. These amounts are excluded from Portfolio Company funded reports |
| ☐1319 | Invested - Blocker expenses | Cash fundings for blocker expenses. These amounts are excluded from Portfolio Company funded reports |
| ☐1320 | Equity from bridge conversions | Bridge loan conversions - Principal portion |
| ☐1325 | Converted from debt interest | Bridge loan conversions - Capitalized interest |
| ☐1328 | In-kind contribution of debt | Equity for debt of 3rd party (See 1268) |
| ☐1331 | Capitalized dividends | Capitalized dividends |
| ☐1341 | Equity received for debt | Equity received in exchange for debt of issuer |
| ☐1346 | Equity rec'd for debt due to merge | Equity received for debt in merger |
| ☐1351 | Exchange of preferred - OI | Exchange preferred stock for another class of issuer's preferred stock |
| ☐1352 | Ex preferred for common - OI | Exchange preferred stock for issuer's common stock |
| ☐1353 | Ex common for preferred - OI | Exchange common stock for issuer's preferred stock |
| ☐1354 | Ex common for common - OI | Exchange common stock for another class of issuer's common stock |
| ☐1355 | Exchange of preferred - Merger | Exchange preferred stock for acquirer's preferred stock |
| ☐1356 | Ex preferred for common - Merger | Exchange preferred stock for acquirer's common stock |
| ☐1357 | Ex common for preferred - Merger | Exchange common stock for acquirer's preferred stock |
| ☐1358 | Ex common for common - Merger | Exchange common stock for another class of acquirer's common stock |
| ☐1359 | Other equity exchanges | Equity exchanges not elsewhere classified |
| ☐1361 | Spin-out | Spin-out transactions |
| ☐1362 | Exercise stock rights | Includes exercise of option, warrant, etc. |
| ☐1363 | Convert convertible securities | Conversion of convertible securities |
| ☐1365 | New securities - Basis reallocation | Reallocate basis due to new securities issuance |
| ☐1369 | Internal entity restructuring | Transaction required for internal structuring only |
| ☐1371 | Equity returned | Cash from port co -- i.e., share buybacks |
| ☐1372 | Sale of equity | Cash from sale/transfer to 3rd party |
| ☐1380 | Unrecovered equity | Equity basis written off |
| ☐1390 | Unrealized Adj - Equity | Unrealized adjustments on equity securities |
| ☐14XX | Feeder/GP Entity investments Sub-species | |
| ☐1410 | Contributions | Contributions to downstream partnership |
| 1419 | Feeder Entity-Outside Basis | Outside basis in feeder entity |
| ☐1420 | Net investment income/loss | Allocations from downstream partnership |
| ☐1430 | Net realized gain/loss | Allocations from downstream partnership |
| ☐1450 | Unrealized adjustments | Allocations from downstream partnership |
| ☐1480 | Distributions | Distributions from downstream partnership |
| ☐1490 | Syndication costs | Syndication costs allocated by downstream ptr |
| ☐15XX | Unit Accounts for Ancillary Portfolio Data Sub-species | |
| ☐1510 | Shares Expected | UNIT AC -- Contractual shares (by series) |
| ☐1511 | Warrants Expected | UNIT AC -- Contractual warrants (by series) |
| ☐1520 | Shares - Received | UNIT AC -- Shares inventory (by series) |
| ☐1521 | Warrants - Received | UNIT AC -- Warrants inventory (by series) |
| ☐1540 | CSE Conversion Rate | UNIT AC -- CSE conversion rate by series |
| 1580 | Invest Contribution Called | UNIT AC -- Investment contributions called |
| 1599 | Investment Commitments | UNIT AC -- Commitments (by series) and reserves |
| ☐16XX | Other Asset Accounts Sub-species | |
| 1610 | Prepaid Insurance | Prepaid insurance |
| 1620 | Prepaid Bank Fee | Prepaid LOC fees, etc. |
| 1650 | Other Prepaids | Other prepaids |
| ☐17XX | Other Receivables Sub-species | |
| 1710 | Accrued Interest Receivable | Accrued interest receivable |
| 1720 | AR for Securities Sold | AR for securities sold |
| 1721 | Escrow Receivable | Escrowed cash proceeds receivable |

TABLE 1-continued

Member definitions for Asset Species (1XXX)

| ID | Description | Definition |
|---|---|---|
| 1722 | Note Receivable for Securities Sold | Note receivable re securities sold |
| 1730 | Accounts Receivable | Due from affiliates |
| 1740 | Due from Affiliates | Other Receivable |

TABLE 2

Member definitions for Liabilities Species (2XXX)

| ID | Description |
|---|---|
| 2000 | Accounts payable |
| 2011 | Due to affiliates |
| 2015 | Accrued liabilities |
| 2020 | Capital call payable |
| 23XX | Notes payable sub-species |
| 2310 | Revolving note - Proceeds |
| 2311 | Revolving note - Re-payments |
| 2312 | Demand note - Proceeds |
| 2313 | Demand note - Re-payments |
| 2700 | Other liabilities |

As illustrated in Table 3, below, Partners' Capital Species Identifiers may identify accounts used to capture partner capital account data, including subscriptions, contributions, distributions, transfers, and income/loss allocations, as well as remaining and fulfilled subscriptions. Design of the Partners' Capital species accounts and identifiers may be highly dependent on the terms of the PE firm's limited partnership agreements. If, for example, the partnership agreement provides for recycling of investment proceeds, a recallable distributions account may be required Likewise, distributions may be captured in the distributions sub-species (33xx), and the level of detail for capturing distribution information may depend on the PE firm's waterfall provisions.

TABLE 3

Member definitions for Partners' Capital Species (3XXX)

| ID | Description |
|---|---|
| 300X | Commitments sub-species |
| 3001 | Initial commitment |
| 3002 | Remaining commitment |
| 3003 | Fulfilled commitment |
| 3004 | Recycled distributions |
| 3005 | Recallable distributions |
| 3100 | Contributions |
| 319X | Blocker corporation capital receipts sub-species |
| 3190 | Common Stock |
| 3191 | Additional Paid in Capital |
| 3199 | Contributions Breakdown |
| 33XX | Distributions sub-species |
| 3391 | Return of capital from blocker |
| 3410 | Syndication costs |
| 3500 | Transfer of capital balance |
| 38XX | Allocations sub-species |
| 3810 | Management fees |
| 3811 | Net investment income/loss |
| 3830 | Realized gains/losses |
| 3850 | Unrealized appreciation/depreciation |
| 39XX | Beginning retained earnings sub-species |
| 3910 | Management fees |
| 3911 | Net investment income/loss |
| 3930 | Realized gains |
| 3931 | Realized losses |
| 3950 | Unrealized appreciation/depreciation |
| 3999 | Automated closing entry |

TABLE 4

Member definitions for Income, Including Portfolio Gains and Losses Species (4XXX)

| ID | Description |
|---|---|
| 41XX | Portfolio income sub-species |
| 4110 | Interest income - Bank |
| 4112 | Interest income - Portfolio |
| 4130 | Dividend income |
| 4190 | Net investment income (loss) from downstream partnerships |
| 4200 | Management fee income |
| 45XX | Portfolio Gains & Losses sub-species |
| 4511 | Realized losses |
| 4521 | CASH Realized gains |
| 4522 | NON-CASH Realized gains |
| 4550 | Unrealized appreciation/depreciation for current period |

TABLE 5

Member definitions for Partnership Expenses Species (7XXX)

| ID | Description |
|---|---|
| 7100 | Management fees |
| 72XX | Professional fees sub-species |
| 7210 | Legal fees |
| 7220 | Audit/tax fees |
| 7280 | Other professional fees |
| 75XX | Interest expense sub-species |
| 7510 | Revolving note |
| 7511 | Demand note |
| 7550 | Other |
| 78XX | Other expenses sub-species |
| 7810 | Printing |
| 7820 | Business license fees |
| 7825 | Franchise fees |
| 7830 | Insurance |
| 7840 | Bank charges |
| 7850 | Bank charges - Line of credit |
| 7871 | Annual meeting expenses - Meals |
| 7872 | Annual meeting expenses - Other |
| 7890 | Penalties |

Although an expansive exemplary set of transaction type members, species, and identifiers is disclosed in Tables 1-5, in a minimal embodiment, as few as four sub-species of transaction types, each having one or more members, may be identified; including those listed in Table 6. Transaction type identifiers in the Equity Invested, Equity Return, and Portfolio Gains/Losses sub-species (e.g., 13XX and 45XX exemplary identifiers) may be used in a four part portfolio series account parameter combination 400. Transaction type identifiers in the Partners' Capital Allocations sub-species (e.g., exemplary identifier 38XX) may be used in a three or four part partner series account identifier combination 500.

TABLE 6

Minimal set of Transaction Type members and exemplary identifiers

| ID | Description |
|---|---|
| 131X | Equity Invested sub-species |
| ☐1310 | Invested - Equity |
| ☐1318 | Invested - Other outside basis |
| 137X | Equity Return sub-species |
| ☐1371 | Equity returned |
| 38XX | Partners' Capital Allocations sub-species |
| 3811 | Net investment income/loss |
| 3830 | Realized gains/losses |

TABLE 6-continued

Minimal set of Transaction Type members and exemplary identifiers

| ID | Description |
| --- | --- |
| 3850 | Unrealized appreciation/depreciation |
| 45XX | Portfolio Gains/Losses sub-species |
| 4521 | Other Realized gains/losses |
| 4522 | Non-Cash Realized gains |
| 4550 | Unrealized appreciation/depreciation for current period |

In another embodiment, the minimal set of transaction types of Table 6 may be expanded to include some or all of those listed in Table 7, which may be used in a four part portfolio series account parameter combination 400.

TABLE 7

Additions to Minimal set of Transaction Types and exemplary identifiers

| ID | Description |
| --- | --- |
| 1210 | Invested - Debt |
| 1276 | Debt repayment |
| 1720 | AR for securities sold |

In still other embodiments, various other subsets of the transaction type identifiers listed in Tables 1-7 may be used.

Investment Entity Identifiers

In accordance with one embodiment, Investment Entity Identifiers 410 may be constructed using exemplary species (and exemplary species identifiers) listed in Table 8.

TABLE 8

Investment Entity Species and Exemplary Identifiers

| ID | Description |
| --- | --- |
| A | Fund investment partnerships |
| F | Feeder entities |
| G | General partner entities |
| H | General partner of the GP entities |
| I | Intermediary entities, i.e., blocker entities |
| S | Special purpose entities |

In an exemplary embodiment, sub-species identifiers 610 are not used in Investment Entity Identifiers 410, and member identifiers 615 may comprise two alphanumeric characters. In one embodiment, member identifiers 615 assigned based on each entity's legal structure. Thus, in an exemplary embodiment, an investment entity may have a unique identifier such as "A01," "A02," "F01," and the like.

Investment Target Identifiers

In accordance with one embodiment, Investment Target Identifiers 415 may be constructed using exemplary species (and exemplary species identifiers) listed in Table 9.

TABLE 9

Investment Target Species and Exemplary Identifiers

| ID | Description |
| --- | --- |
| C | targets directly invested in |
| I | targets indirectly invested in (e.g., targets invested in through an intermediary or blocker corporation) |
| S | targets invested in through a special purpose entity |

In an exemplary embodiment, sub-species identifiers 610 are not used in Investment Target Identifiers 415, and member identifiers 615 may comprise three alphanumeric characters, unique to each target. In an exemplary embodiment, cross-over investments (i.e., investments in a single portfolio company by multiple funds) use the same Investment Target Identifier 415 in both funds. Conversely, in the event of spin-outs, mergers and acquisitions, and other restructuring activities, a new Investment Target Identifier 415 may be assigned to the successor company.

In one embodiment, supplemental information may be used to provide a more descriptive name for some or all investment targets. For example, an investment target having an identifier such as "C001," may be associated with supplemental information comprising a company name, e.g., A Big Deal, Inc. Such supplemental information may be used, for example, for printing on reports. As with other types of supplemental information, company name supplemental information may be maintained in a spreadsheet file, in an external database, in a text file, on a network accessible data store, or in another electronic data source.

Security Type Identifiers

In one embodiment, Security Type Identifiers 420 may be constructed using exemplary species (and exemplary species identifiers) listed in Table 10.

TABLE 10

Security Type Species and exemplary identifiers

| ID | Species |
| --- | --- |
| A | Notes |
| C | Preferred Stock |
| D | LLC - Preferred interest |
| G | Common Stock |
| H | LLC - Common interest |
| J | Options - Preferred (Stock or LLC) |
| K | Options - Common (Stock or LLC) |
| O | Warrants - Preferred Stock |
| P | Warrants - Common Stock |
| T | Escrow - Preferred Stock |
| U | Escrow - Preferred LLC Interest |
| V | Escrow - Common Stock |
| W | Escrow - Common LLC Interest |

In an exemplary embodiment, Sub-Species Identifiers 610 are not used in Security Type Identifiers 420, and member identifiers 615 may comprise three alphanumeric characters. In one embodiment, member identifiers 615 assigned to ensure that securities for a target sort in the proper order on a schedule of investments. Thus, in an exemplary embodiment, a security may have a unique identifier such as "C0A0" (e.g., Series A Preferred Stock); "C0A1" (e.g., Series A-1 Preferred Stock); "C1A0" (e.g., Series 1-A Preferred Stock); and the like. In one embodiment, an identifier such as "RRRR" may be used to denote reserves if a PE firm elects to track reserves.

In one embodiment, supplemental information may be used to provide a more descriptive name for some or all security types of some or all investment targets. For example, a security type having an identifier such as "C0A0," may be associated with supplemental information comprising a descriptive security name, e.g., "Series A redeemable participating preferred stock." Such supplemental information may be used, for example, for printing on reports. As with other types of supplemental information, security name supplemental information may be maintained in a spreadsheet file, in an external database, in a text file, on a network accessible data store, in another electronic data source, or the like.

In some embodiments, descriptive security name supplemental information may be cross-indexed by investment target. For example when reporting on security identifier "C0A0" as issued by investment target identifier "C001," the descriptive security name may be identified as "Series A redeemable participating preferred stock." However, when reporting on security identifier "C0A0" as issued by investment target identifier "C002," the descriptive security name may be identified as "8% Series A participating preferred stock."

Partner Identifiers

In accordance with one embodiment, Partner Identifiers 515 may be constructed using the exemplary species (and exemplary species identifier) in Table 11.

TABLE 11

Partner Species and Exemplary Identifier

| ID | Species |
| --- | --- |
| PG | General Partner investor entities |
| P1-P9 | Limited Partner investor entities |

In other embodiments, one or more sub-species identifiers 610 may be used to distinguish General Partner entities from limited partner entities. In an exemplary embodiment, member identifiers 615 may comprise two alphanumeric characters.

In one embodiment, the same field may be used for both Investment Target Identifiers 415 and Partner Identifiers 515, in which case, Investment Target Species Identifiers (such as those listed in Table 9) may be chosen to be distinct from Partner Species Identifiers (such as those listed in Table 11).

In one embodiment, supplemental information may be used to provide a more descriptive name (e.g., "ABC Pension Plan") for some or all partners in a manner similar to that described above for other types of supplemental information.

Partner Transaction Type Identifier

In various embodiments, Partner Transaction Type Identifier 520 may optionally be used to capture information relevant to a particular investment entity's investment (or partnership) agreement. For example, if the limited partnership agreement provides for deemed distributions, Partner Transaction Type Identifier 520 may use species identifiers to distinguish between cash and deemed distributions. Likewise, a species identifier may be used when the investment agreement provides for "cashless" contributions by the GP. An exemplary list of Partner Transaction Type Identifiers 520 is provided in Table 12.

TABLE 12

Exemplary Partner Transaction Identifiers

| | |
| --- | --- |
| 00CC | Cash contribution or distribution |
| 00DD | Deemed cash contribution or distribution |
| 00IE | Interest equivalent contributions (due to multiple closings) |
| 00OF | Contra (offset) to adjust for timing of contributions (due to multiple closings) |
| 00SS | Stock distribution |
| 00ZY | GP deemed offset contra |
| 00ZZ | GP management fee offset |
| 00CI | Carried interest (to capture GP's carried interest allocations) |
| TRCC | Transfer (to transfer contribution activity) |
| TRIE | Transfer (to transfer interest equivalent contribution activity) |
| TRAN | Transfer (to transfer other elements of capital account activity) |
| INKD | In-kind contributions (to transfer across entities) |

Other Transaction Parameter Classes

In various embodiments, additional transaction parameter classes may include some or all of the following:

Associate Identity: An Associate Identity transaction parameter class may enable a PE firm to filter certain investment reports for a subset of the portfolio assigned to a specific associate (i.e., PE firm employee responsible for the investment).

Active Thru Date: An Active Thru Date transaction parameter class may be used to exclude information on inactive accounts. An exemplary identifier convention is YYYYMMDD.

Status: A Status transaction parameter class may be used to segregate publicly-traded and privately-held investments.

Partner: The Partner transaction parameter class may enable a PE firm to filter transactions by lead partner.

Figure 7:
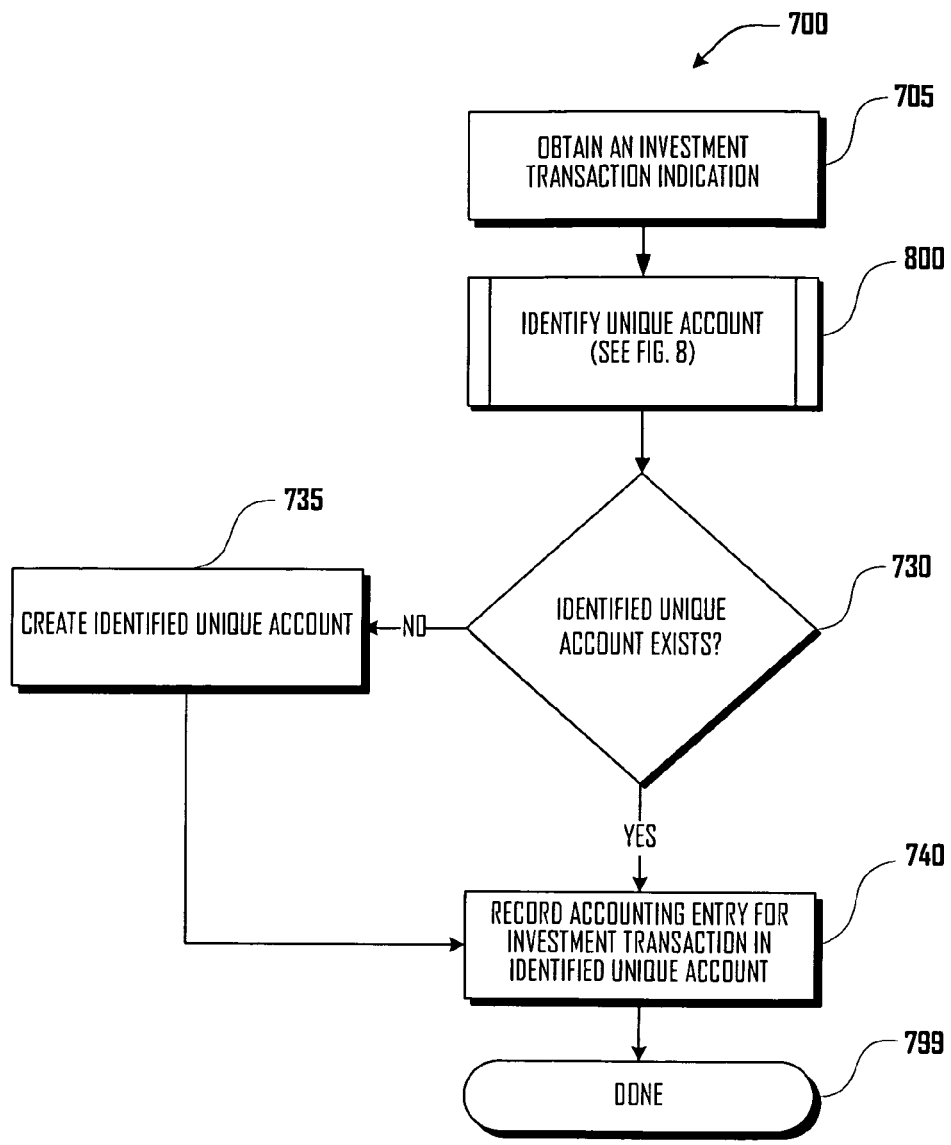
FIG. 7 is a flow diagram illustrating an account creation and entry recording routine in accordance with one embodiment.

FIG. 7 is a flow diagram illustrating an account creation and entry recording routine 700 in accordance with one embodiment. At block 705, routine 700 obtains an indication of an investment transaction. In one embodiment, the indicated investment transaction includes transaction parameters including at least an identity of the investment entity 305, an identity of the investment target 315, a type of the security involved in the transaction 320, and a type of the transaction 310. Using the transaction parameters, subroutine 800, illustrated in FIG. 8 and discussed below, identifies a unique account for transactions with the indicated combination of transaction parameters. In decision block 730, routine 700 determines whether the uniquely identified account already exists. If the uniquely identified account does exist (because, e.g., a previous transaction had the same combination of transaction parameters as the indicated transaction), then in block 740, an accounting entry for the indicated investment transaction is recorded in the uniquely identified account.

If in block 730, the uniquely identified account is determined to not exist (because, e.g., the indicated transaction is the first to have the particular combination of transaction parameters), then in block 735, the uniquely identified account is created using the indicated combination of transaction parameters. After the uniquely identified account is created, in block 740, an accounting entry for the indicated investment transaction is recorded in the uniquely identified account. The routine 700 ends at block 799.

Figure 8:
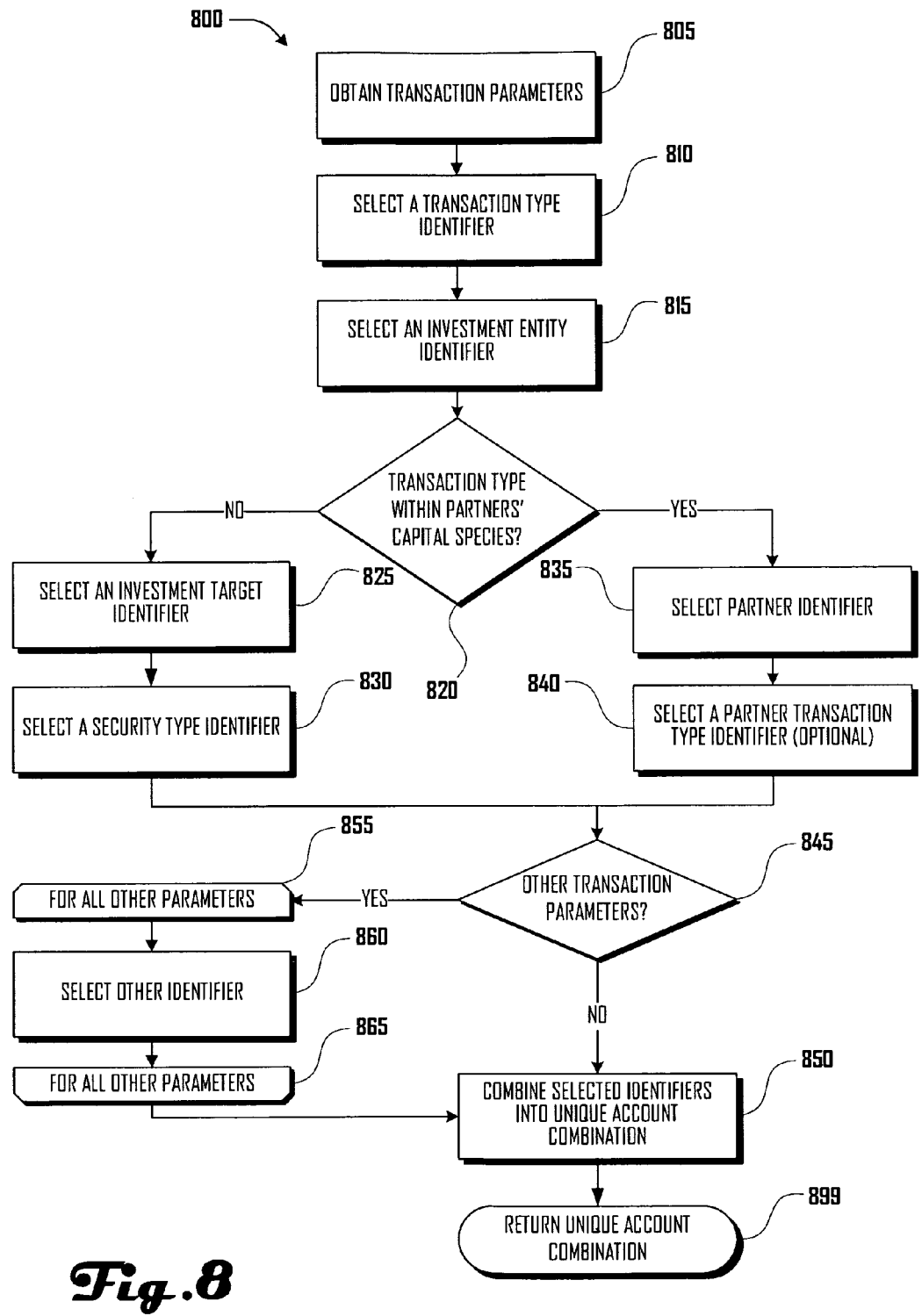
FIG. 8 is a flow diagram illustrating an account identification routine in accordance with one embodiment.

FIG. 8 is a flow diagram illustrating an account identification subroutine 800 in accordance with one embodiment. The subroutine 800 begins in block 805, in which a plurality of transaction parameters is obtained, typically from a calling routine. In block 810, a transaction type identifier 405 is selected from a transaction type identifier list. In an exemplary embodiment, the selected transaction type identifier 405 is structured as discussed above in Tables 1-5 and associated text. Similarly, in block 815, an investment entity identifier 410 is selected from an investment entity identifier list. In an exemplary embodiment, the selected investment entity identifier 410 is structured as discussed above in Table 8 and associated text.

In decision block 820, subroutine 800 determines whether the selected transaction type identifier 405 is within the Partners' Capital species, as discussed above in reference to Table 3. If the selected transaction type identifier 405 is within the Partners' Capital species, then the subroutine 800 needs to select identifiers for a Partners' Capital identifier combination 500, as illustrated in FIG. 5. In block 835, a partner identifier 515 is selected from a partner identifier list. In an exemplary embodiment, the selected partner identifier 515 is structured as discussed above in Table 11 and associated text.

In block 840, a partner transaction type identifier 520 is optionally selected from a partner transaction type identifier list. In an exemplary embodiment, the selected partner transaction type identifier 520 is structured as discussed above in Table 12 and associated text.

If in decision block 820, the selected transaction type identifier 405 is determined to be outside the Partners' Capital species, then the subroutine 800 needs to select identifiers for a Portfolio Series identifier combination 400, as illustrated in FIG. 4. In block 825, an investment target identifier 415 is selected from an investment target identifier list. In an exemplary embodiment, the selected investment target identifier 415 is structured as discussed above in Table 9 and associated text. In block 830, a security type identifier 420 is selected from a security type identifier list. In an exemplary embodiment, the selected security type identifier 420 is structured as discussed above in Table 10 and associated text.

In decision block 845, subroutine 800 determines whether there are transaction parameters other than those discussed above. If so, subroutine 800 loops from beginning block 855 to ending block 865, selecting other identifiers in block 860 from other identifier lists, as appropriate.

In block 850, the selected identifiers 405-10 and 415-20 or 515-20 (and other identifiers, if other transaction parameters were determined in block 845) are combined into a unique account combination 400 or 500. The subroutine 800 ends in block 899, returning the combined unique account combination 400 or 500.

Typically, the various identifier lists discussed above in reference to FIG. 8 are stored in one or more electronic data sources accessible by the subroutine 800, such as, in various embodiments, a database, spreadsheet, text file, binary file, network server, and the like.

Reporting

In various embodiments, general ledgers may have a great number of accounts, and transactions related to a particular investment may be split up among several accounts. As such, it may be desirable to utilize a reporting tool capable of "rolling-up" accounting entries in various accounts to obtain data related to various reporting metrics.

Figure 9:
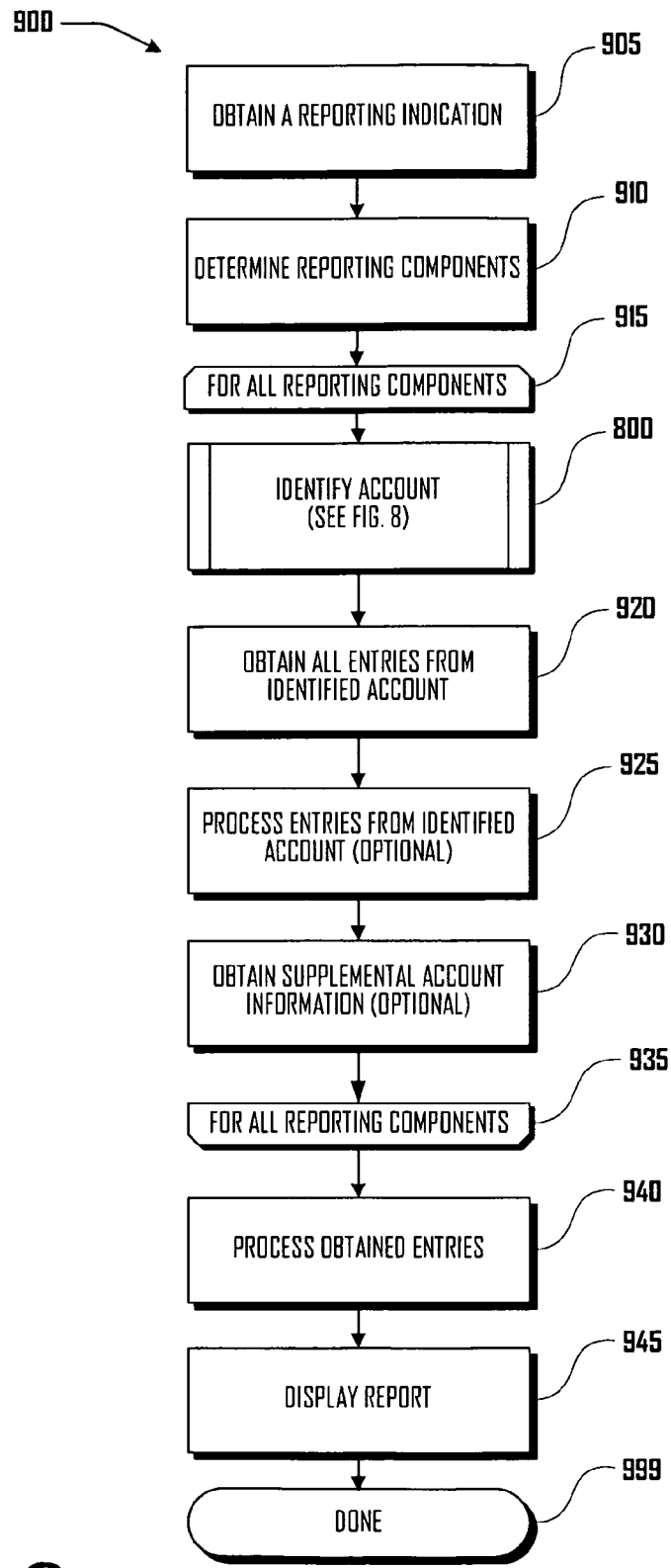
FIG. 9 is a flow diagram illustrating a reporting routine in accordance with one embodiment.

FIG. 9 is a flow diagram illustrating a reporting routine 900 in accordance with one embodiment. The reporting routine 900 begins in block 905, in which it receives a reporting indication. In an exemplary embodiment, the reporting indication may include one of the reports listed in Appendix A and FIGS. 10-28, although in various embodiments, more or fewer reporting indications may be supported. In an exemplary embodiment, the reporting indication may also include one or more transaction parameters, including a particular investment target, investment entity, security type, partner, and/or partner transaction type.

Various reports utilize accounting entries from one or more accounts, selected according to various predetermined criteria. In step 910, reporting routine 900 determines one or more reporting components necessary to generate the indicated report. As used herein, the term "reporting component" refers to a numerical figure that may be derived from accounting entries in accounts identified by one or more unique combinations of transaction parameters. For example, in step 905, the reporting routine 900 may obtain an indication to generate an Internal Rate of Return (IRR) Report for a particular investment entity and a particular investment target, the indicated IRR Report having the following lines:

Cash investments (excluding blocker expense fundings), net of bridge loan proceeds;
Cash proceeds received (excluding bridge loan proceeds);
Proceeds receivable; and
Remaining fair value.

Having received an IRR Report indication, in step 910, reporting routine 900 may determine that each line requires one or more reporting components. For example, the "Cash investments" line may require four reporting components, comprising accounts having the following transaction types: Equity investments (e.g., transaction type identifier 1310); Debt Investments (e.g. transaction type identifier 1210); Outside basis (e.g. transaction type identifier 1318); and Bridge loan proceeds (e.g. transaction type identifier 127X).

Continuing with the same example, the "Remaining fair value" line may require other reporting components, comprising accounts having the following transaction types: Debt Investments (12XX)+Equity Investments (13XX).

Various other reporting lines may similarly require various other predetermined reporting components. Once all required reporting components have been determined in block 910, reporting routine 900 iterates over all reporting components from beginning block 915 to ending block 935. In block 800, the account identification subroutine 800, illustrated in FIG. 8 and discussed above, is run to identify the account associated with the indicated transaction parameters and the current reporting component. In block 920, reporting routine 900 obtains all accounting entries from the identified account. In block 925, reporting routine 900 optionally processes the accounting entries obtained in block 920. For example, if required by the indicated report, the accounting entries may be sub-totaled by date. Similarly, if required by the indicated report, in block 930, supplemental information associated with one or more of the transaction parameters currently being processed. For example, reporting routine 900 may obtain a legal name of an investment entity or target, or a descriptive name of a security. The reporting component processing loop ends at block 935, and if there are other reporting components to process, reporting routine iterates back to block 915 to process the next reporting component.

Once all reporting components have been processed, reporting routine 900 proceeds to block 940, where the various accounting entries obtained and/or processed in iterative blocks 920 and/or 925 are further processed. For example, to generate a Cash investments line for an IRR Report, a sum of accounting entries from the Bridge loan proceeds component may be subtracted from a sum of accounting entries from the Equity investments component, from the Debt Investments component, and from the Outside basis component.

In block 945, the obtained and processed components are combined with supplemental information obtained (if any), and the report formatted for display on an output device, such as a display, monitor, printer, or electronic storage device. Reporting routine ends at block 999.

Exemplary Reports

FIG. 10 is an exemplary Partner Capital Account Summary report 1000 in accordance with one embodiment. Data is shown reported on a quarterly 1005A-D, annual 1010, and FTD 1015 basis. In various embodiments, a Partner Capital Account Summary report may be run for any 12 month period for a single investment entity or a "family" of investment entities.

FIG. 11 is an exemplary Portfolio Summary report 1100 in accordance with one embodiment. In various embodiments, a Portfolio Summary report 1100 may include additional information such as current ownership, lead partner, geographic region, and/or public/private status. In some embodiments, a Portfolio Summary report 1100 can be designed to run for subsets of the portfolio (such as lead partner).

FIG. 12 is an exemplary Returns Analysis report 1200 in accordance with one embodiment. The illustrated report 1200 shows a gross Internal Rate of Return ("IRR") for the investment entity, as well as a Net IRR 1210 for only limited partner investor entities, and a Net IRR 1215 for all investor entities.

FIG. 13 is an exemplary Gross IRR Analysis report 1300 in accordance with one embodiment. In some embodiments, IRR by investment target may also be presented. In various embodiments, a Gross IRR Analysis report 1300 may be run for subsets of an investment portfolio, such as by partner, sector, or region.

FIG. 14 is an exemplary Transaction Detail report 1400 in accordance with one embodiment. In some embodiments, a Transaction Detail report 1400 may be generated for various subsets, including for a single deal, for a single investment target, for a subset of the fund's investment portfolio such as a single investment entity, for all investment targets, for a specific time period, and/or fund-to-date.

FIG. 15 is an exemplary Schedule of Portfolio Investments report 1500 in accordance with one embodiment. In various embodiments, a Schedule of Portfolio Investments report 1500 may be run at the fund or investment entity level.

FIG. 16 is an exemplary Portfolio Investments for Specified Period report 1600 in accordance with one embodiment. In various embodiments, a Portfolio Investments for Specified Period report 1600 may be generated for any user-defined period over the entire life of the fund.

FIG. 17 is an exemplary Realizations report 1700 in accordance with one embodiment.

FIG. 18 is an exemplary Statement of Assets, Liabilities, and Partners' Capital report 1800 in accordance with one embodiment.

FIG. 19 is an exemplary Statement of Operations report 1900 in accordance with one embodiment.

Figure 20:
FIG. 20 is an exemplary Statement of Cash Flows report in accordance with one embodiment.

FIG. 20 is an exemplary Statement of Cash Flows report 2000 in accordance with one embodiment.

FIG. 21 is an exemplary Partners Capital Account Activity report 2100 in accordance with one embodiment.

FIG. 22 is an exemplary Condensed Schedule of Portfolio Investments report 2200 in accordance with one embodiment.

FIG. 23 is an exemplary Treasury Status report 2300 in accordance with one embodiment.

FIG. 24 is an exemplary Deal Summary report 2400, in accordance with one embodiment, showing fund totals with details by various investment entities 2505A-C. In various embodiments, a Deal Summary report 2400 may also be generated for a user-defined period.

FIG. 25 is an exemplary Funding Detail report 2500 in accordance with one embodiment Like Transaction Detail report 1400, in various embodiments, a Funding Detail report 2500 may be generated for a subset of the investment portfolio or a user-defined period.

Figure 26:
FIG. 26 is an exemplary Statement of Changes in Partners' Capital report in accordance with one embodiment.

FIG. 26 is an exemplary Statement of Changes in Partners' Capital report 2600 in accordance with one embodiment.

FIG. 27 is an exemplary Statement of Operations Detail report 2700 in accordance with one embodiment. In various embodiments, a Statement of Operations Detail report 2700 may be generated on a quarterly, fiscal year, or fund-to-date basis.

FIG. 28 is an exemplary "Dashboard" report 2800, which summarizes desired information in accordance with one embodiment.

APPENDICES

An exemplary listing of report definitions is included as Appendix A. Appendix B provides a set of illustrative accounting entries using Gain/Loss account identifier combinations. Appendix C provides a set of illustrative accounting entries using Entity (i.e., Partner) Capital account identifier combinations.

Although specific embodiments have been illustrated and described herein, it will be appreciated by those of ordinary skill in the art that a whole variety of alternate and/or equivalent implementations may be substituted for the specific embodiments shown and described without departing from the scope of the present invention. This application is intended to cover any adaptations or variations of the embodiments discussed herein.

Appendix A

© 2006, Jayne Thompson
VC View Report Descriptions
Portfolio Analysis
Gross IRR—Details of calculation of portfolio-level ("gross") IRR. Includes IRR calculations by individual investment and the ability to expand cash flow detail by investment. May be run using either an actual date or mid-month convention for cashflows.
Net IRR—All Partners—Details of calculation of Net IRR to all Partners (including the GP). Includes the ability to expand contributions and distributions details by date. May be run using either an actual date or mid-month convention for cashflows. The results will not be valid for periods after the most recent quarterly closing.
Net IRR—Limited Partners Only—Details of calculation of Net IRR to Limited Partners only. Includes the ability to expand contributions and distributions details by date. May be run using either an actual date or mid-month convention for cashflows. The results will not be valid for periods after the most recent quarterly closing.
Weekly Dashboard—Snapshot of portfolio, including commitments, investments and reserves by sector; recent portfolio transactions; commitment and investment information on five largest fund commitments; and cash/LOC availability.
Fund Total Value Rollforward—Displays by portfolio company the total value at beginning of quarter, amounts invested during the quarter, the net increase (decrease) from operating activities, and total value at the end of the quarter.
Fund Fair Value Rollforward—Displays by portfolio company the unrealized value at the beginning of quarter, the categories of transactions affecting remaining fair value (e.g., investment purchases or realizations, unrealized adjustments, and other income related adjustments), and unrealized value at the end of the quarter.
Lead Ptr IRR—Details of calculation of portfolio-level ("gross") IRR for selected "lead" partner. Includes the ability to expand cash flow detail by investment. Also includes summary of amounts invested by sector and year.
Ptr IRR—Details of calculation of portfolio-level ("gross") IRR for selected "assigned" partner. Includes the ability to expand cash flow detail by investment. Also includes summary of amounts invested by sector and year.
(Sector) IRR—Details of calculation of portfolio-level ("gross") IRR for selected sector. Includes the ability to expand cash flow detail by investment. Also includes summary of amounts invested by year.
IRR by Sector—Details of calculation of portfolio metrics by sector, including IRR.

IRR by Partner—Details of calculation of portfolio metrics by lead partner, including IRR.

Financial Statements and Supporting Schedules

Allocations Worksheets

Allocations Worksheets—Provides the data for the quarterly allocations calculations and uploads to Dynamics GL.

8/20% Pref Return—Calculates the 8 or 20 percent (as applicable) preferred return as required for quarter allocations.

Fund Entity Financial Statements Report Package**

Balance Sheet—Statement of Assets, Liabilities and Partners' Capital.

Statement of Operations—Statement of Operations—Quarter and YTD.

Statement of Partner Capital—Statement of Changes in Net Assets—Quarter and YTD.

Statement of Cash Flows—Statement of Cash Flows—Quarter and YTD.

Portfolio Investments—Schedule of Portfolio Investments.

Capital Accounts—Individual Capital Accounts—Quarter, YTD and FTD.

Supplemental Financial Reports

Fund Capital Summary—Side-by-side Statement of Changes in Partners' Capital for fund entities.

Condensed Port Sch—Summaries by a) Category, b) Sector, and c) Security Type for selected fund entity for inclusion in audited statements.

Operations Detail QTR—Summarizes Investment Income, Unrealized Adjustments, and Realized Gain/Loss by portfolio company for user selected three month period.

Operations Detail YTD—Summarizes Investment Income, Unrealized Adjustments, and Realized Gain/Loss by portfolio company through user selected month end for the current fiscal year.

Portfolio Monitoring

Activity by Associate—Detail of transactions (dollars and shares) by portfolio company for user-selected Columbia Associate and thru user-selected date. Includes capitalized interest but does not include blocker fundings.

Certificate Inventory—Detail of stock certificates expected (per the closing documents) and received as certificated shares. Use as a tickler report to identify certificates for follow-up.

Deal Funding Activity—Detail of transactions (dollars and shares) by user-selected "deal" thru user-selected date. Includes capitalized interest but does not include blocker fundings. See Deal Trans Detail report for all activity. A "deal" may include multiple portfolio companies.

Deal Trans Detail—Detail of all transactional activity for a "deal", including amounts funded to related companies, blocker fundings, capitalized interest, OID amortization, basis returned, and basis written off. Does not include shares (see Deal Funding Activity report). A "deal" may include multiple portfolio companies.

Fund Portfolio—Consolidated schedule of Portfolio Investments for Columbia IV as of user-selected date.

FY Investment by Quarter—Details of amounts invested (funded only) by entity subtotaled by quarter for the current fiscal year.

Investment by Quarter—Details of amounts invested (funded only) by entity for user-defined three month period.

Investment by Sector—Amount invested (funded only) by company by sector and category (Technology v. Services) through user-selected period.

Period Invested—Details of amounts invested (funded only) by portfolio company and security for user-defined period. Includes monthly subtotals.

Period Invested by Co—Details of amounts invested (funded only) subtotaled by portfolio company for user-defined period.

Period Realized—Details proceeds received, proceeds receivable, cost relieved and realized gain or loss by portfolio company for user-defined reporting period.

Portfolio Co Trans Detail—Detail of remaining basis for user-selected portfolio company, including amounts funded to company, blocker fundings, capitalized interest, OID amortization, basis returned, and basis written off. Does not include shares (see Portfolio Company Detail report).

Portfolio by Category—Summary of amount invested (funded only) by each fund entity in each portfolio company grouped by category (services v. technology) through user-selected period.

Portfolio by Transaction—Amount invested (funded only) by security by transaction date through user-selected period end. Includes original investment amounts only; does not include exchanges.

Portfolio Company Detail—Detail of transactions (dollars and shares) for a user-selected single portfolio company grouped by security. Includes funded amounts only excluding blocker fundings. Does not include other items affecting basis such as capitalized interest. See Portfolio Co Trans Detail report for all activity affecting basis.

Valuation JE—Worksheet for calculation of valuation adjustments by security and fund entity. Includes journal entry for upload.

Commitments Reports (if applicable)

Entity Commitments—Detail of amounts funded and committed by portfolio company for selected fund entity. Used for footnote disclosure in annual audited statements.

Fund Commitments—Detail of amounts funded, committed and reserved by sector and portfolio company.

Investment Transactions Report Package**

Portfolio Summary—Summary of amount invested (i.e., funded only) by portfolio company by fund entity. Includes both direct and indirect investments. Does not include blocker fundings.

Portfolio Investments at Cost—Detail of securities purchased by fund entity (including capitalization investment income). Includes both direct and indirect investments. Includes original investments purchases only; does not reflect exchanges.

Trans Detail—Detail of all transactions affecting remaining basis for all companies in the portfolio. Includes both direct and indirect investments by fund entity. A summary by type of transactional activity (i.e., funded amounts, capitalized interest, OID amortization, basis recovered, and basis written off) appears at the end of the report. Does not include shares; see Fund Detail report for this information.

FTD Realizations—Detail of proceeds realized, proceeds receivable, basis relieved, and realized gain/loss by portfolio company by transaction date.

Fund Detail—Detail of transactions (dollars and shares) for all companies in the portfolio. Includes both direct and indirect investments by fund entity. Includes funded cost and capitalized interest and reflects exchanges but does not include other basis adjustments. See Trans Detail for complete basis information.

Direct Detail—Detail of transactions (dollars and shares) for all companies in the portfolio by direct investing entity. Includes funded cost and capitalized interest and reflects exchanges but does not include other basis adjustments.

Employee Investment Entity Summary—Detail of amounts funded by portfolio company and security for each employee investor. Grand total ties to employee investment entity total on Portfolio Summary report.

Blocker Funding—Detail of blocker fundings by blocker corporation (with notation of security to which the blocker funding is appended for financial reporting purposes).

Partners' Capital

Capital Account Reports

Capital AC—Individual—Individual capital account for user-selected partner and twelve month reporting period (must end on quarter).

Capital Call AR—Unpaid capital calls by entity.

Capital Call Worksheets

GP Cont by Entity by Date—Summarizes total contributions (including cashless contributions but excluding the adjustment for no self-charged management fee) by the General Partner by entity by transaction date. Use this report to calculate the amount to call from the General Partner entity.

Management Fees—Calculates quarterly management fees, net of deemed contribution offsets.

Capital Call—Calculates individual capital call amounts for fund partnership (and the offshore feeder entity). User inputs are i) Investment amount, ii) number of days in quarter for management fee calculation, iii) Expense amount, iv) offshore feeder expense amount, v) call date and vi) due date.

Entity Level Partners' Capital Reports

Capital AC—Entity-Entity-level capital account for user-selected entity and 12-month reporting period (must end on quarter).

Capital AC—Fund-Fund-level capital account for user-selected 12-month reporting period (must end on quarter).

Cash Contributions by Entity by Date—Total cash contributions by entity by transaction date. Does not include interest equivalent contributions.

Contributions by Entity by Date—"Contributions" as defined in limited partnership agreement by entity by transaction date. Includes cashless GP contribution and GP management fee contribution. Does not include interest equivalent contributions.

Distributions by Entity by Date—Distributions by entity by transaction date.

Partners' Capital Report Package**

Entity Summary—Summary of capital account activity by entity, including offsets for no self-charged management fee and cashless contributions by the GP.

Partner Capital Summary—Detail by partner of subscriptions, remaining subscriptions, and FTD contributions and distributions.

Subs by Closing—Detail of Subscriptions by closing date.

Contributions Detail—Detail of "Contributions" (as defined in limited partnership agreement) by partner and due date for each entity.

Cash Contributions Detail—Detail of cash contributions by partner and due date for each entity. Does not include interest equivalent contributions.

Interest Equivalent Contributions—Detail of interest equivalent contributions for LPs admitted after initial fund closing.

GP Deemed Detail—Detail of GP's deemed ("cashless") contribution by call date.

Treasury Reports

Debt Cov—Calculates financial ratio covenants for credit agreement.

Treasury Status—Daily treasury status report including cash, LOC, receivables and payables balances.

** "Report packages" are generated as multiple spreadsheets in a single workbook. Any report definition may be grouped with any other report definition(s) to create a report package. The report packages designated above are recommended as a minimum.

Appendix B

© 2006, Jayne Thompson

Example Accounting Entries

VC View

Sample Journal Entries—Portfolio Investments

|  | Main Segment | Entity Segment | ID Segment | Type Segment | DR | CR |
|---|---|---|---|---|---|---|
| Example assumptions: | | | | | | |
| 1. Two fund investing entities: | | | | | | |
| Qualified Purchaser Entity (90% of commitments) | | A01 | | | | |
| Offshore Entity (10% of commitments) | | A02 | E20F | | | |
| 2. Portfolio company | | | | | | |
| ABC, LLC | | | | | | |
| For direct investments | | | CABC | | | |
| For indirect investments | | | IABC | | | |
| 3. Blocker corporation for offshore fund | | | I01 | | | |
| 4. Securities acquired | | | | | | |
| Series A preferred stock | | | | C0A0 | | |
| Convertible notes | | | | A001 | | |
| 5. Securities received in exchance | | | | | | |
| Common stock | | | | G000 | | |
| Sample entries: | | | | | | |
| A. Acquire 100,000 shares of Series A preferred stock for $1M (i.e., $10 per share) | | | | | | |
| Invested - equity (by QP Entity) | 1310 | A01 | CABC | C0A0 | 900,000 | |
| Invested - equity (by Offshore Entity) | 1310 | A02 | IABC | C0A0 | 100,000 | |

-continued

| | Main Segment | Entity Segment | ID Segment | Type Segment | DR | CR |
|---|---|---|---|---|---|---|
| Invested - equity (by Blocker Corp) | 1310 | I01 | CABC | C0A0 | 100,000 | |
| Cash (QP Entity) | 1000 | A01 | 0000 | 0000 | | 900,000 |
| Cash (Offshore Entity) | 1000 | A02 | 0000 | 0000 | | 100,000 |
| Contributed Capital in Blocker Corp | 3191 | I01 | E20F | 0000 | | 100,000 |
| Shares expected (by QP Entity) | 1510 | A01 | CABC | C0A0 | 90,000 | |
| Shares expected (by Offshore Entity) | 1510 | A02 | IABC | C0A0 | 10,000 | |
| Shares expected (by Blocker Corp) | 1510 | I01 | CABC | C0A0 | 10,000 | |

\*\* Since Shares expected (and shares received below) are unit (rather than posting) accounts, these entries are one-sided.

B. Receive stock certificates for above transaction

| | | | | | | |
|---|---|---|---|---|---|---|
| Shares received (by QP Entity) | 1520 | A01 | CABC | C0A0 | 90,000 | |
| Shares received (by Offshore Entity) | 1520 | A02 | IABC | C0A0 | 10,000 | |
| Shares received (by Blocker Corp) | 1520 | I01 | CABC | C0A0 | 10,000 | |

C. Acquire $500,000 of 10% convertible notes

| | | | | | | |
|---|---|---|---|---|---|---|
| Invested - debt (by QP Entity) | 1210 | A01 | CABC | A001 | 450,000 | |
| Invested - debt (by Offshore Entity) | 1210 | A02 | IABC | A001 | 50,000 | |
| Invested - debt (by Blocker Corp) | 1210 | I01 | CABC | A001 | 50,000 | |
| Cash (QP Entity) | 1000 | A01 | 0000 | 0000 | | 450,000 |
| Cash (Offshore Entity) | 1000 | A02 | 0000 | 0000 | | 50,000 |
| Contributed Capital (Blocker Corp) | 3191 | I01 | E20F | 0000 | | 50,000 |

D. Record first year of interest on notes

| | | | | | | |
|---|---|---|---|---|---|---|
| Accrued interest receivable (QP Entity) | 1710 | A01 | CABC | A001 | 45,000 | |
| Accrued interest receivable (Blocker Corp) | 1710 | I01 | CABC | A001 | 5,000 | |
| Portfolio interest income (QP Entity) | 4112 | A01 | CABC | A001 | | 45,000 |
| Portfolio interest income (Blocker Corp) | 4112 | I01 | CABC | A001 | | 5,000 |

E. Convert Series A preferred and convertible notes (including principal and interest) to 10,000 shares of common stock

| | | | | | | |
|---|---|---|---|---|---|---|
| Exchange preferred for common (QP Entity) | 1352 | A01 | CABC | G000 | 900,000 | |
| Exchange preferred for common (Offshore Entity) | 1352 | A02 | IABC | G000 | 100,000 | |
| Exchange preferred for common (Blocker Corp) | 1352 | I01 | CABC | G000 | 100,000 | |
| Exchange preferred for common (QP Entity) | 1352 | A01 | CABC | C0A0 | | 900,000 |
| Exchange preferred for common (Offshore Entity) | 1352 | A02 | IABC | C0A0 | | 100,000 |
| Exchange preferred for common (Blocker Corp) | 1352 | I01 | CABC | C0A0 | | 100,000 |
| Converted from debt principal (QP Entity) | 1320 | A01 | CABC | G000 | 450,000 | |
| Converted from debt principal (Offshore Entity) | 1320 | A02 | IABC | G000 | 50,000 | |
| Converted from debt principal (Blocker Corp) | 1320 | I01 | CABC | G000 | 50,000 | |
| Conv debt converted to equity (QP Entity) | 1261 | A01 | CABC | A001 | | 450,000 |
| Conv debt converted to equity (Offshore Entity) | 1261 | A02 | IABC | A001 | | 50,000 |
| Conv debt converted to equity (Blocker Corp) | 1261 | I01 | CABC | A001 | | 50,000 |
| Converted from debt interest (QP Entity) | 1325 | A01 | CABC | G000 | 45,000 | |
| Converted from debt interest (Offshore Entity) | 1325 | A02 | IABC | G000 | 5,000 | |
| Converted from debt interest (Blocker Corp) | 1325 | I01 | CABC | G000 | 5,000 | |
| Accrued interest receivable | 1710 | A01 | CABC | A001 | | 45,000 |
| Contra - Blocker interest capitalized | 1329 | A02 | IABC | A001 | | 5,000 |
| Accrued interest receivable | 1710 | I01 | CABC | A001 | | 5,000 |
| Shares expected (by QP Entity) | 1510 | A01 | CABC | C0A0 | | 90,000 |
| Shares expected (by Offshore Entity) | 1510 | A02 | IABC | C0A0 | | 10,000 |
| Shares expected (by Blocker Corp) | 1510 | I01 | CABC | C0A0 | | 10,000 |
| Shares expected (by QP Entity) | 1510 | A01 | CABC | G000 | 9,000 | |
| Shares expected (by Offshore Entity) | 1510 | A02 | IABC | G000 | 1,000 | |
| Shares expected (by Blocker Corp) | 1510 | I01 | CABC | G000 | 1,000 | |

F. Return Series A preferred stock certificates

| | | | | | | |
|---|---|---|---|---|---|---|
| Shares received (by QP Entity) | 1520 | A01 | CABC | C0A0 | | 90,000 |
| Shares received (by Offshore Entity) | 1520 | A02 | IABC | C0A0 | | 10,000 |
| Shares received (by Blocker Corp) | 1520 | I01 | CABC | C0A0 | | 10,000 |

G. Receive common stock certificates

| | | | | | | |
|---|---|---|---|---|---|---|
| Shares received (by QP Entity) | 1520 | A01 | CABC | G000 | 9,000 | |
| Shares received (by Offshore Entity) | 1520 | A02 | IABC | G000 | 1,000 | |
| Shares received (by Blocker Corp) | 1520 | I01 | CABC | G000 | 1,000 | |

H. Fund $10,000 of blocker expenses

| | | | | | | |
|---|---|---|---|---|---|---|
| Invested - Blocker expenses | 1319 | A02 | IABC | G000 | 10,000 | |
| Cash (of Offshore Entity) | 1000 | A02 | 0000 | 0000 | | 10,000 |
| Cash (of Blocker Corp) | 1000 | I01 | 0000 | 0000 | 10,000 | |
| Contributed Capital (Blocker Corp) | 3191 | I01 | E20F | 0000 | | 10,000 |

I. Sell common shares for $3M including 10% escrow (presume that Offshore Entity sells blocker shares in transaction)

| | | | | | | |
|---|---|---|---|---|---|---|
| Cash (QP Entity) | 1000 | A01 | 0000 | 0000 | 2,430,000 | |
| Cash (Offshore Entity) | 1000 | A02 | 0000 | 0000 | 270,000 | |
| AR - Securities sold (QP Entity) | 1720 | A01 | CABC | G000 | 270,000 | |

-continued

| | Main Segment | Entity Segment | ID Segment | Type Segment | DR | CR |
|---|---|---|---|---|---|---|
| AR - Securities sold (Offshore Entity) | 1720 | A02 | IABC | G000 | 30,000 | |
| Sale of equity (QP Entity) | 1372 | A01 | CABC | G000 | | 1,395,000 |
| Sale of equity (Offshore Entity) | 1372 | A02 | IABC | G000 | | 160,000 |
| Cash realized gain (QP Entity) | 4521 | A01 | CABC | G000 | | 1,305,000 |
| Cash realized gain (Offshore Entity) | 4521 | A02 | IABC | G000 | | 140,000 |

(You would also relieve shares expected and received on the sale date by reversing the related entries.)

J. Collect 75% of the escrow and write-off balance

| | Main Segment | Entity Segment | ID Segment | Type Segment | DR | CR |
|---|---|---|---|---|---|---|
| Cash (QP Entity) | 1000 | A01 | 0000 | 0000 | 202,500 | |
| Cash (Offshore Entity) | 1000 | A02 | 0000 | 0000 | 22,500 | |
| Cash realized gain (QP Entity) | 4521 | A01 | CABC | G000 | 67,500 | |
| Cash realized gain (Offshore Entity) | 4521 | A02 | IABC | G000 | 7,500 | |
| AR - Securities sold (QP Entity) | 1720 | A01 | CABC | G000 | | 270,000 |
| AR - Securities sold (Offshore Entity) | 1720 | A02 | IABC | G000 | | 30,000 |

Appendix C

© 2006, Jayne Thompson

Example Accounting Entries

The invention claimed is:

1. A computer-implemented accounting method for a private equity investment portfolio comprising a plurality of investments, the investment portfolio having a plurality of investment entities, the accounting method comprising:

| | Capital Commitment | Main Segment | Entity Segment | ID Segment | Type Segment | DR | CR |
|---|---|---|---|---|---|---|---|
| Example Assumptions for Main Fund Partnership (Entity A01) | | | | | | | |
| ABC Limited Partner | 95,000 | | | P002 | | | |
| General Partner | 5,000 | | | PG01 | | | |
| Total | 100,000 | | | | | | |

Other assumptions:

2% management fee
20% of GP contributions done on a cashless basis

Sample entries:

A. Record initial commitments

| | | Main Segment | Entity Segment | ID Segment | Type Segment | DR | CR |
|---|---|---|---|---|---|---|---|
| Initial commitment - ABC | | 3001 | A01 | P002 | 0000 | 95,000 | |
| Initial commitment - GP | | 3001 | A01 | PG01 | 0000 | 5,000 | |
| Remaining commitment - ABC | | 3002 | A01 | P002 | 0000 | | 95,000 |
| Remaining commitment - GP | | 3002 | A01 | PG01 | 0000 | | 5,000 |

B. Call $20,000 for investments plus management fee (assume you call a full year of fees to simplify example calculations)

| | | Main Segment | Entity Segment | ID Segment | Type Segment | DR | CR |
|---|---|---|---|---|---|---|---|
| Capital call receivable - ABC | | 1100 | A01 | P002 | 0000 | 20,900 | |
| Capital call receivable - GP | | 1100 | A01 | PG01 | 0000 | 800 | |
| Contributions - No self chg mgmt fee offset | | 3100 | A01 | PG01 | 00ZZ | 100 | |
| Contributions - Deemed offset | | 3100 | A01 | PG01 | 00ZY | 200 | |
| Contributions - ABC | | 3100 | A01 | P002 | 00CC | | 20,900 |
| Contributions - GP | | 3100 | A01 | PG01 | 00CC | | 1,100 |

The JE date should be the DUE date of the call. We typically include the call date in the description.

| | | Main Segment | Entity Segment | ID Segment | Type Segment | DR | CR |
|---|---|---|---|---|---|---|---|
| Remaining commitment - ABC | | 3002 | A01 | P002 | 0000 | 20,900 | |
| Remaining commitment - GP | | 3002 | A01 | PG01 | 0000 | 1,100 | |
| Commitment fulfilled - ABC | | 3003 | A01 | P002 | 0000 | | 20,900 |
| Commitment fulfilled - GP | | 3003 | A01 | PG01 | 0000 | | 1,100 |

C. Collect capital call

| | | Main Segment | Entity Segment | ID Segment | Type Segment | DR | CR |
|---|---|---|---|---|---|---|---|
| Cash | | 1000 | A01 | 0000 | 0000 | 20,900 | |
| Capital call receivable - ABC | | 1100 | A01 | P002 | 0000 | | 20,900 |
| Cash | | 1000 | A01 | 0000 | 0000 | 800 | |
| Capital call receivable - GP | | 1100 | A01 | PG01 | 0000 | | 800 |

D. Pay management fees, net of deemed offset

| | | Main Segment | Entity Segment | ID Segment | Type Segment | DR | CR |
|---|---|---|---|---|---|---|---|
| Management fees | | 7100 | A01 | 0000 | 0000 | 1,900 | |
| Management fees - Deemed offset | | 7100 | A01 | 0000 | 00OC | | 200 |
| Cash | | 1000 | A01 | 0000 | 0000 | | 1,700 | obtaining, by the computer via an electronic data input interface, an investment transaction indication specifying a combination of at least four particular transaction dimensions, including a particular investment entity, a particular investment target, a particular transaction type, and a particular security type;

determining, by the computer, a gene-ledger-account identifier identifying a gene-ledger account uniquely associated with said specified combination of said at least four particular transaction dimensions, said gene-ledger-account identifier comprising at least four gene-ledger-account-identifier segments as follows:

a transaction type gene-ledger-account-identifier segment comprising one of at least six asset transaction type identifiers selected according to said particular transaction type;

an investment entity gene-ledger-account-identifier segment comprising one of a plurality of unique investment entity identifiers selected according to said particular investment entity;

an investment target gene-ledger-account-identifier segment comprising one of a plurality of investment target identifiers selected according to said particular investment target; and a security type gene-ledger-account-identifier segment comprising one of a plurality of security type identifiers selected according to said particular security type;

using said determined gene-ledger-account identifier, the computer determining whether said gene-ledger account uniquely associated with said specified combination of said at least four particular transaction dimensions exists in a general ledger associated with said investment transaction indication;

when said gene-ledger account is determined not to exist in said general ledger, creating in said general ledger, by the computer, a new gene-ledger account, identified by said gene-ledger-account identifier, to exclusively record investment-transaction-related accounting entries associated with said specified combination of said at least four particular transaction dimensions; and recording, in said gene-ledger account uniquely associated with said specified combination of said at least four particular transaction dimensions, an accounting entry individually corresponding to said investment transaction indication specifying said combination of at least four particular transaction dimensions;

wherein said at least six asset transaction type identifiers comprise the following subsets:

a first subset comprising:
a first identifier distinguishably associated with an Invested—Equity transaction type; and
a second identifier distinguishably associated with an Invested—Other outside basis transaction type;

a second subset comprising a third identifier distinguishably associated with an Equity returned transaction type; and a third subset comprising:
a fourth identifier distinguishably associated with an Other Realized gains/losses transaction type;
a fifth identifier distinguishably associated with a Non-Cash Realized gains transaction type; and
a sixth identifier distinguishably associated with an Unrealized appreciation/depreciation for current period transaction type.

2. The method of claim 1 further comprising obtaining a reporting component associated with said particular combination of said at least four particular transaction dimensions by operating on all accounting entries in said gene-ledger account uniquely associated with said specified combination of said at least four particular transaction dimensions.

3. The method of claim 1 wherein said at least six asset transaction type identifiers, from which said investment entity gene-ledger-account-identifier segment is selected, further comprise a subset of identifiers distinguishably associated with a plurality of debt asset transaction types comprising: Invested—Debt, and Debt repayment.

4. The method of claim 1 wherein a subset of said at least six asset transaction type identifiers, from which said transaction type gene-ledger-account-identifier segment is selected, are distinguishably associated with a plurality of equity asset transaction types comprising at least a majority of: Invested-Equity; Invested-CR (credit) Adjustments; Invested-DR (debit) Adjustments; Invested-Other outside basis; Invested-Blocker expenses; Equity from bridge conversions; Converted from debt interest; In-kind contribution of debt; Capitalized dividends; Equity received for debt; Equity rec'd (received) for debt due to merg (merger); Other equity exchanges; Spin-out; Exercise stock rights; Convert convertible securities; New securities—Basis reallocation; Internal entity restructuring; Equity returned; Sale of equity; Unrecovered equity; and Unrealized Adj (adjustments)—Equity.

5. The method of claim 1 wherein a subset of said at least six asset transaction type identifiers, from which said transaction type gene-ledger-account-identifier segment is selected, are distinguishably associated with a plurality of debt asset transaction types comprising at least a majority of: Invested-Debt; Invested-Debt CR (credit) adjustments; Invested-Debt DR (debit) adjustments; OID (original issue discount) on funded debt; Capitalized interest-Debt; Periodic accreting interest; OID amortization; Original Issue Discount; OID Amortization; Debt received for equity; OID on exchange debt; OID amortization on exchange debt; Bridge converted to debt; Other debt exchanges; Bridge converted to equity; Cony (convertible) debt converted to equity; Contributed debt; Debt security repayment; Debt transfer; Bridge repayment; Unrecovered debt; and Unrealized adjustments on debt.

6. The method of claim 1 wherein at least one of said plurality of investment target identifiers comprises an investment species identifier.

7. The method of claim 6, wherein said investment species identifier is selected from a direct investment identifier, an indirect investment identifier, and a special purpose entity identifier.

8. A non-transient tangible computer-readable medium containing instructions that when executed by a processor, perform an accounting method for a private equity investment portfolio comprising a plurality of investments, the investment portfolio having a plurality of investment entities, the accounting method comprising:

obtaining an investment transaction indication specifying a combination of at least four particular transaction dimensions, including a particular investment entity, a particular investment target, a particular transaction type, and a particular security type;

determining a gene-ledger-account identifier identifying a gene-ledger account uniquely associated with said specified combination of said at least four particular transaction dimensions, said gene-ledger-account iden tifier comprising at least four gene-ledger-account-identifier segments as follows:
  a transaction type gene-ledger-account-identifier segment comprising one of at least six asset transaction type identifiers selected according to said particular transaction type;
  an investment entity gene-ledger-account-identifier segment comprising one of a plurality of unique investment entity identifiers selected according to said particular investment entity;
  an investment target gene-ledger-account-identifier segment comprising one of a plurality of investment target identifiers selected according to said particular investment target; and
  a security type gene-ledger-account-identifier segment comprising one of a plurality of security type identifiers selected according to said particular security type;
using said determined gene-ledger-account identifier, determining whether said gene-ledger account uniquely associated with said specified combination of said at least four particular transaction dimensions exists in a general ledger associated with said investment transaction indication;
when said gene-ledger account is determined not to exist in said general ledger, creating in said general ledger a new gene-ledger account, identified by said gene-ledger-account identifier, to exclusively record investment-transaction-related accounting entries associated with said specified combination of said at least four particular transaction dimensions; and
recording, in said gene-ledger account uniquely associated with said specified combination of said at least four particular transaction dimensions, an accounting entry individually corresponding to said investment transaction indication specifying said combination of at least four particular transaction dimensions;
wherein said at least six asset transaction type identifiers comprise the following subsets:
  a first subset comprising:
    a first identifier distinguishably associated with an Invested—Equity transaction type; and
    a second identifier distinguishably associated with an Invested—Other outside basis transaction type;
  a second subset comprising a third identifier distinguishably associated with an Equity returned transaction type; and
  a third subset comprising:
    a fourth identifier distinguishably associated with an Other Realized gains/losses transaction type;
    a fifth identifier distinguishably associated with a Non-Cash Realized gains transaction type; and
    a sixth identifier distinguishably associated with an Unrealized appreciation/depreciation for current period transaction type.

9. An apparatus comprising a processor and a memory containing instructions that when executed by the processor, configure the processor to perform an accounting method for an investment portfolio comprising a plurality of investments, the investment portfolio having a plurality of investment entities, the accounting method comprising:
  obtaining an investment transaction indication specifying a combination of at least four particular transaction dimensions, including a particular investment entity, a particular investment target, a particular transaction type, and a particular security type;
  determining a gene-ledger-account identifier identifying a gene-ledger account uniquely associated with said specified combination of said at least four particular transaction dimensions, said gene-ledger-account identifier comprising at least four gene-ledger-account-identifier segments as follows:
    a transaction type gene-ledger-account-identifier segment comprising one of at least six asset transaction type identifiers selected according to said particular transaction type;
    an investment entity gene-ledger-account-identifier segment comprising one of a plurality of unique investment entity identifiers selected according to said particular investment entity;
    an investment target gene-ledger-account-identifier segment comprising one of a plurality of investment target identifiers selected according to said particular investment target; and
    a security type gene-ledger-account-identifier segment comprising one of a plurality of security type identifiers selected according to said particular security type;
  using said determined gene-ledger-account identifier, determining whether said gene-ledger account uniquely associated with said specified combination of said at least four particular transaction dimensions exists in a general ledger associated with said investment transaction indication;
  when said gene-ledger account is determined not to exist in said general ledger, creating in said general ledger a new gene-ledger account, identified by said gene-ledger-account identifier, to exclusively record investment-transaction-related accounting entries associated with said specified combination of said at least four particular transaction dimensions; and
  recording, in said gene-ledger account uniquely associated with said specified combination of said at least four particular transaction dimensions, an accounting entry individually corresponding to said investment transaction indication specifying said combination of at least four particular transaction dimensions;
  wherein said at least six asset transaction type identifiers comprise the following subsets:
    a first subset comprising:
      a first identifier distinguishably associated with an Invested-Equity transaction type; and
      a second identifier distinguishably associated with an Invested—Other outside basis transaction type;
    a second subset comprising:
      a third identifier distinguishably associated with an Equity returned transaction type; and
    a third subset comprising:
      a fourth identifier distinguishably associated with an Other Realized gains/losses transaction type;
      a fifth identifier distinguishably associated with a Non-Cash Realized gains transaction type; and
      a sixth identifier distinguishably associated with an Unrealized appreciation/depreciation for current period transaction type.

10. A computer-implemented accounting method for a private equity investment portfolio comprising a plurality of investments, the investment portfolio having a plurality of investment entities, the accounting method comprising:
  obtaining, by the computer via an electronic data input interface, an investment transaction indication specifying a combination of at least four particular transaction dimensions, including a particular investment entity, a particular investment target, a particular transaction type, and a particular security type;
determining, by the computer, a gene-ledger-account identifier identifying a gene-ledger account uniquely associated with said specified combination of said at least four particular transaction dimensions, said gene-ledger-account identifier comprising at least four gene-ledger-account-identifier segments as follows:
- a transaction type gene-ledger-account-identifier segment comprising one of at least six asset transaction type identifiers selected according to said particular transaction type;
- an investment entity gene-ledger-account-identifier segment comprising one of a plurality of unique investment entity identifiers selected according to said particular investment entity;
- an investment target gene-ledger-account-identifier segment comprising one of a plurality of investment target identifiers selected according to said particular investment target; and
- a security type gene-ledger-account-identifier segment comprising one of a plurality of security type identifiers selected according to said particular security type;

using said determined gene-ledger-account identifier, the computer determining whether said gene-ledger account uniquely associated with said specified combination of said at least four particular transaction dimensions exists in a general ledger associated with said investment transaction indication;
when said gene-ledger account is determined not to exist in said general ledger, creating in said general ledger, by the computer, a new gene-ledger account, identified by said gene-ledger-account identifier, to exclusively record investment-transaction-related accounting entries associated with said specified combination of said at least four particular transaction dimensions; and
recording, in said gene-ledger account uniquely associated with said specified combination of said at least four particular transaction dimensions, an accounting entry individually corresponding to said investment transaction indication specifying said combination of at least four particular transaction dimensions;
wherein said at least six asset transaction type identifiers, from which said investment entity gene-ledger-account-identifier segment is selected, further comprise subset of identifiers distinguishably associated with a plurality of debt asset transaction types comprising: Invested-Debt, and Debt repayment;
wherein said at least six asset transaction type identifiers include a subset of debt asset transaction type identifiers comprising:
- a first identifier distinguishably associated with an Invested-Debt transaction type;
- a second identifier distinguishably associated with a Debt repayment transaction type.

11. The method of claim 10, further comprising obtaining a reporting component associated with said particular combination of said at least four particular transaction dimensions by operating on all accounting entries in said gene-ledger account uniquely associated with said specified combination of said at least four particular transaction dimensions.

12. The method of claim 10, wherein a subset of said at least six asset transaction type identifiers, from which said transaction type gene-ledger-account-identifier segment is selected, are distinguishably associated with a plurality of equity asset transaction types comprising at least a majority of: Invested-Equity; Invested-CR (credit) Adjustments; Invested-DR (debit) Adjustments; Invested—Other outside basis; Invested-Blocker expenses; Equity from bridge conversions; Converted from debt interest; In-kind contribution of debt; Capitalized dividends; Equity received for debt; Equity rec'd (received) for debt due to merg (merger); Other equity exchanges; Spin-out; Exercise stock rights; Convert convertible securities; New securities—Basis reallocation; Internal entity restructuring; Equity returned; Sale of equity; Unrecovered equity; and Unrealized Adj (adjustments)-Equity.

13. The method of claim 10, wherein a subset of said at least six asset transaction type identifiers, from which said transaction type gene-ledger-account-identifier segment is selected, are distinguishably associated with a plurality of debt asset transaction types comprising at least a majority of: Invested-Debt; Invested-Debt CR (credit) adjustments; Invested-Debt DR (debit) adjustments; OID (original issue discount) on funded debt; Capitalized interest—Debt; Periodic accreting interest; OID amortization; Original Issue Discount; OID Amortization; Debt received for equity; OID on exchange debt; OID amortization on exchange debt; Bridge converted to debt; Other debt exchanges; Bridge converted to equity; Cony (convertible) debt converted to equity; Contributed debt; Debt security repayment; Debt transfer; Bridge repayment; Unrecovered debt; and Unrealized adjustments on debt.

14. The method of claim 10, wherein at least one of said plurality of investment target identifiers comprises an investment species identifier.

15. The method of claim 14, wherein said investment species identifier is selected from a direct investment identifier, an indirect investment identifier, and a special purpose entity identifier.

16. A non-transient tangible computer-readable medium containing instructions that, when executed by a processor, perform an accounting method for a private equity investment portfolio comprising a plurality of investments, the investment portfolio having a plurality of investment entities, the accounting method comprising:
obtaining an investment transaction indication specifying a combination of at least four particular transaction dimensions, including a particular investment entity, a particular investment target, a particular transaction type, and a particular security type;
determining a gene-ledger-account identifier identifying a gene-ledger account uniquely associated with said specified combination of said at least four particular transaction dimensions, said gene-ledger-account identifier comprising at least four gene-ledger-account-identifier segments as follows:
- a transaction type gene-ledger-account-identifier segment comprising one of at least six asset transaction type identifiers selected according to said particular transaction type;
- an investment entity gene-ledger-account-identifier segment comprising one of a plurality of unique investment entity identifiers selected according to said particular investment entity;
- an investment target gene-ledger-account-identifier segment comprising one of a plurality of investment target identifiers selected according to said particular investment target;
- a security type gene-ledger-account-identifier segment comprising one of a plurality of security type identifiers selected according to said particular security type;

using said determined gene-ledger-account identifier, determining whether said gene-ledger account uniquely associated with said specified combination of said at least four particular transaction dimensions exists in a general ledger associated with said investment transaction indication;

when said gene-ledger account is determined not to exist in said general ledger, creating in said general ledger a new gene-ledger account, identified by said gene-ledger-account identifier, to exclusively record investment-transaction-related accounting entries associated with said specified combination of said at least four particular transaction dimensions; and recording, in said gene-ledger account uniquely associated with said specified combination of said at least four particular transaction dimensions, an accounting entry individually corresponding to said investment transaction indication specifying said combination of at least four particular transaction dimensions;

wherein said at least six asset transaction type identifiers, from which said investment entity gene-ledger-account-identifier segment is selected, further comprise subset of identifiers distinguishably associated with a plurality of debt asset transaction types comprising: Invested-Debt, and Debt repayment;

wherein said at least six asset transaction type identifiers include a subset of debt asset transaction type identifiers comprising:
- a first identifier distinguishably associated with an Invested-Debt transaction type;
- a second identifier distinguishably associated with a Debt repayment transaction type; and
  - a third identifier distinguishably associated with an AR (accounts receivable) for securities sold transaction type.

17. An apparatus comprising a processor and a memory containing instructions that when executed by the processor, configure the processor to perform an accounting method for an investment portfolio comprising a plurality of investments, the investment portfolio having a plurality of investment entities, the accounting method comprising:

obtaining an investment transaction indication specifying a combination of at least four particular transaction dimensions, including a particular investment entity, a particular investment target, a particular transaction type, and a particular security type;

determining a gene-ledger-account identifier identifying a gene-ledger account uniquely associated with said specified combination of said at least four particular transaction dimensions, said gene-ledger-account identifier comprising at least four gene-ledger-account-identifier segments as follows:
- a transaction type gene-ledger-account-identifier segment comprising one of at least six asset transaction type identifiers selected according to said particular transaction type;
- an investment entity gene-ledger-account-identifier segment comprising one of a plurality of unique investment entity identifiers selected according to said particular investment entity;
- an investment target gene-ledger-account-identifier segment comprising one of a plurality of investment target identifiers selected according to said particular investment target; and
- a security type gene-ledger-account-identifier segment comprising one of a plurality of security type identifiers selected according to said particular security type;

using said determined gene-ledger-account identifier, determining whether said gene-ledger account uniquely associated with said specified combination of said at least four particular transaction dimensions exists in a general ledger associated with said investment transaction indication;

when said gene-ledger account is determined not to exist in said general ledger, creating in said general ledger a new gene-ledger account, identified by said gene-ledger-account identifier, to exclusively record investment-transaction-related accounting entries associated with said specified combination of said at least four particular transaction dimensions; and recording, in said gene-ledger account uniquely associated with said specified combination of said at least four particular transaction dimensions, an accounting entry individually corresponding to said investment transaction indication specifying said combination of at least four particular transaction dimensions;

wherein said at least six asset transaction type identifiers, from which said investment entity gene-ledger-account-identifier segment is selected, further comprise subset of identifiers distinguishably associated with a plurality of debt asset transaction types comprising: Invested-Debt, and Debt repayment;

wherein said at least six asset transaction type identifiers include a subset of debt asset transaction type identifiers comprising:
- a first identifier distinguishably associated with an Invested-Debt transaction type; and
- a second identifier distinguishably associated with a Debt repayment transaction type.

* * * * *